US012635764B2

(12) United States Patent
Greenberg et al.

(10) Patent No.: US 12,635,764 B2
(45) Date of Patent: May 26, 2026

(54) METHOD FOR MANUFACTURING A HANDS-FREE MOLDED SHOE

(71) Applicant: Skechers U.S.A., Inc. II, Manhattan Beach, CA (US)

(72) Inventors: Chase Greenberg, Manhattan Beach, CA (US); Abel Casas, Lawndale, CA (US)

(73) Assignee: Skechers U.S.A., Inc. II, Manhattan Beach, CA (US)

( * ) Notice: Subject to any disclaimer, the term of this patent is extended or adjusted under 35 U.S.C. 154(b) by 0 days.

(21) Appl. No.: 19/183,676

(22) Filed: Apr. 18, 2025

(65) Prior Publication Data

US 2025/0325070 A1     Oct. 23, 2025

Related U.S. Application Data

(62) Division of application No. 18/914,224, filed on Oct. 13, 2024, now Pat. No. 12,501,967.

(60) Provisional application No. 63/636,403, filed on Apr. 19, 2024.

(51) Int. Cl.
| | |
|---|---|
| *A43B 13/16* | (2006.01) |
| *A43B 13/12* | (2006.01) |
| *A43B 13/14* | (2006.01) |
| *A43B 13/18* | (2006.01) |
| *B29D 35/06* | (2010.01) |

(52) U.S. Cl.
CPC ............. *A43B 13/16* (2013.01); *A43B 13/12* (2013.01); *A43B 13/146* (2013.01); *A43B 13/186* (2013.01); *B29D 35/06* (2013.01)

(58) Field of Classification Search
CPC ...... A43B 13/16; A43B 23/088; B29D 35/02; B29D 35/122; B29D 35/142; B29C 45/0062
See application file for complete search history.

(56) References Cited

U.S. PATENT DOCUMENTS

| | | | | |
|---|---|---|---|---|
| 1,782,620 | A | 11/1930 | Jones | |
| 4,706,316 | A * | 11/1987 | Tanzi | A43B 9/12 |
| | | | | 12/146 D |
| 5,353,526 | A * | 10/1994 | Foley | A43B 23/16 |
| | | | | 36/35 R |
| 10,455,898 | B1 * | 10/2019 | Orand | A43C 11/08 |
| 2001/0016992 | A1 * | 8/2001 | Gross | A43B 3/16 |
| | | | | 36/114 |
| 2001/0032399 | A1 * | 10/2001 | Litchfield | A43B 23/025 |
| | | | | 36/114 |

(Continued)

FOREIGN PATENT DOCUMENTS

| | | |
|---|---|---|
| FR | 2772564 | 6/1999 |

OTHER PUBLICATIONS

Office Action for PCT/US2024/052684 dated Apr. 4, 2025.

*Primary Examiner* — Jillian K Pierorazio
(74) *Attorney, Agent, or Firm* — Marshall A. Lerner; Steven J. Kim; Daniel J. Malkin

(57) ABSTRACT

A METHOD FOR MANUFACTURING A HANDS-FREE MOLDED SHOE may include placing a substrate insert into a first shoe mold where the substrate insert includes a heel insert, providing a first plastic to the first shoe mold to yield a substrate, placing the substrate and an overmold insert into a second shoe mold, and providing a second plastic to the second shoe mold to yield a shoe. The first plastic has a greater hardness than the second plastic.

22 Claims, 27 Drawing Sheets

(56)        References Cited

U.S. PATENT DOCUMENTS

| | | | |
|---|---|---|---|
| 2002/0066213 A1* | 6/2002 | Wells | A43B 3/0084 |
| | | | 223/118 |
| 2005/0229436 A1* | 10/2005 | Bock | A43B 5/1691 |
| | | | 36/89 |
| 2005/0268485 A1* | 12/2005 | Sakai | A43B 7/18 |
| | | | 36/11.5 |
| 2009/0072436 A1* | 3/2009 | Dean | B29D 35/128 |
| | | | 264/223 |
| 2010/0028778 A1 | 2/2010 | Schuch et al. | |
| 2011/0119959 A1* | 5/2011 | Bodner | A43B 15/00 |
| | | | 36/78 |
| 2011/0252670 A1* | 10/2011 | Smith | A43B 13/023 |
| | | | 12/146 B |
| 2012/0025520 A1 | 2/2012 | Xu | |
| 2012/0198730 A1* | 8/2012 | Burch | A43B 23/0245 |
| | | | 264/138 |
| 2014/0130380 A1* | 5/2014 | Anderson | A43B 23/16 |
| | | | 36/107 |
| 2015/0113830 A1* | 4/2015 | Dillinger | A43B 23/28 |
| | | | 12/147 R |
| 2016/0136912 A1* | 5/2016 | Le | A43B 1/0027 |
| | | | 12/146 B |
| 2016/0331075 A1* | 11/2016 | Cook | A43B 13/189 |
| 2016/0360823 A1* | 12/2016 | Garbujo | A43B 5/0496 |
| 2018/0103727 A1* | 4/2018 | Fracassi | A43B 23/026 |
| 2018/0255868 A1* | 9/2018 | Cole | A43B 13/42 |
| 2019/0045884 A1* | 2/2019 | Uda | A43B 23/0205 |
| 2019/0297991 A1* | 10/2019 | Bongers | A43B 23/042 |
| 2020/0170348 A1* | 6/2020 | Beers | A43B 3/0063 |
| 2020/0196703 A1* | 6/2020 | Hopkins | A43B 23/047 |
| 2020/0196787 A1* | 6/2020 | Dament | A47G 25/82 |
| 2020/0205511 A1* | 7/2020 | Hopkins | A43B 11/02 |
| 2020/0229536 A1* | 7/2020 | Hopkins | A43B 11/02 |
| 2021/0076772 A1* | 3/2021 | Baghdadi | B29C 45/0001 |
| 2021/0195985 A1* | 7/2021 | Kormann | B29B 17/0042 |
| 2021/0354345 A1* | 11/2021 | Archer | B29C 44/105 |
| 2021/0378357 A1* | 12/2021 | Chen | A43B 13/023 |
| 2021/0401117 A1* | 12/2021 | Tanabe | B29C 44/42 |
| 2022/0018448 A1 | 1/2022 | Lee | |
| 2022/0055269 A1* | 2/2022 | Mortensen | B29D 35/122 |
| 2022/0274297 A1* | 9/2022 | Chang | B29C 44/355 |
| 2022/0312886 A1* | 10/2022 | Labonté | A43B 5/16 |
| 2022/0332026 A1* | 10/2022 | Bigolin | B62J 1/26 |
| 2022/0369760 A1* | 11/2022 | Behnamian | A61H 7/001 |
| 2022/0402236 A1* | 12/2022 | Dua | B32B 27/30 |
| 2023/0006882 A1 | 1/2023 | Davis | |
| 2023/0019678 A1* | 1/2023 | Hannemann | B29C 44/3446 |
| 2023/0028474 A1 | 1/2023 | Veraitch et al. | |
| 2023/0150221 A1* | 5/2023 | Hartmann | B29C 45/2602 |
| | | | 12/21 |
| 2023/0203289 A1* | 6/2023 | Baghdadi | C08J 9/0061 |
| | | | 521/89 |
| 2023/0210213 A1* | 7/2023 | Dojan | A43B 13/12 |
| | | | 36/28 |
| 2023/0309648 A1* | 10/2023 | Reinhardt | B29D 35/0054 |
| | | | 264/109 |
| 2023/0312858 A1* | 10/2023 | Constantinou | A43B 13/187 |
| | | | 521/50.5 |
| 2023/0346067 A1* | 11/2023 | Ventenat | A43B 13/04 |
| 2023/0399499 A1* | 12/2023 | Baghdadi | C08L 23/0853 |
| 2023/0407033 A1* | 12/2023 | Archer | C08J 9/12 |
| 2024/0059038 A1* | 2/2024 | Dyer | B29C 45/14467 |
| 2024/0065373 A1* | 2/2024 | Farr | B29D 35/08 |
| 2024/0084087 A1* | 3/2024 | Baghdadi | A43B 13/026 |
| 2024/0084088 A1* | 3/2024 | Baghdadi | A43D 119/00 |

* cited by examiner

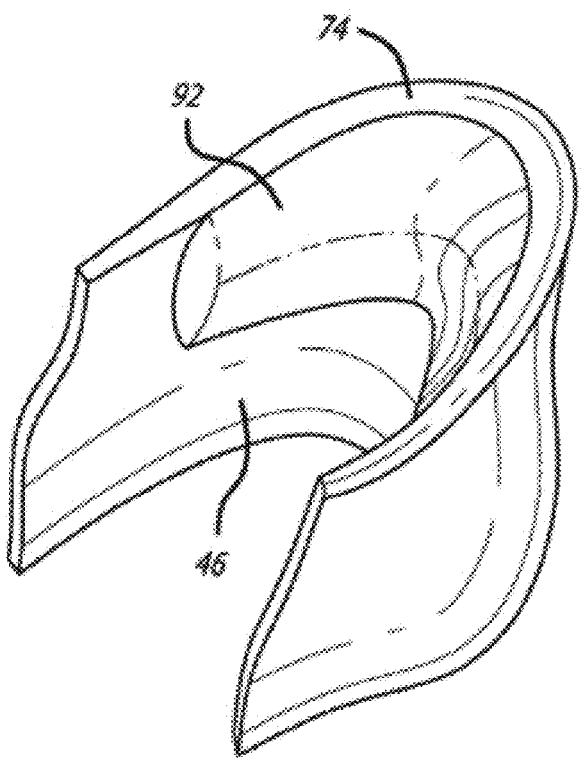
FIG. 11C
FIG. 11D
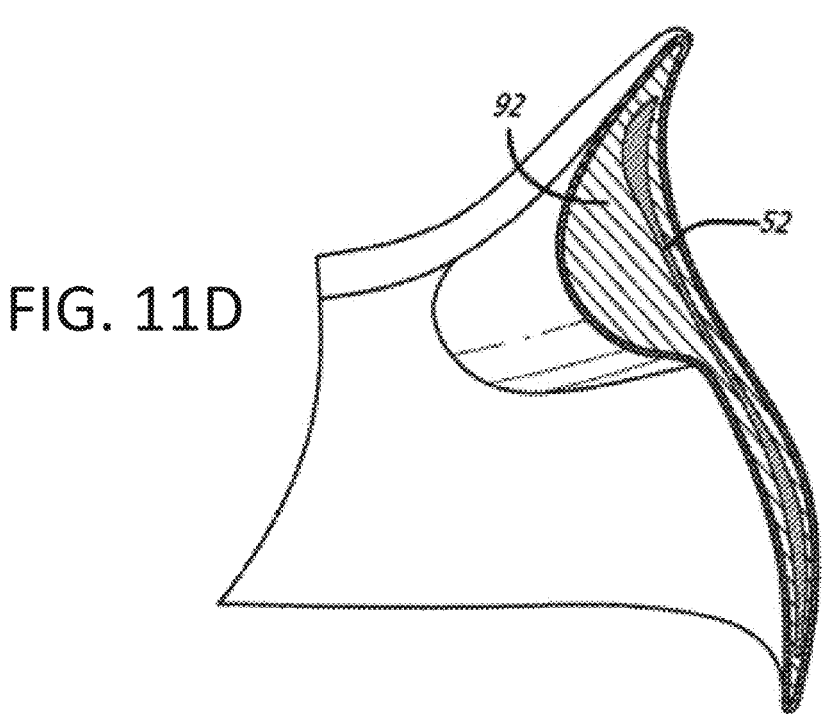

1701

METHOD FOR MANUFACTURING A HANDS-FREE MOLDED SHOE

PRIORITY CLAIM AND RELATED APPLICATIONS

This application is a divisional of co-pending U.S. patent application Ser. No. 18/914,224, filed on Oct. 13, 2024, and titled "HANDS-FREE MOLDED SHOE," which claims priority to U.S. provisional patent application Ser. No. 63/636,403, entitled, "HANDS-FREE MOLDED SHOE," filed Apr. 19, 2024. The entire contents of the aforementioned applications are hereby incorporated in their entirety herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD OF THE DISCLOSURE

The present innovations generally address footwear, and more particularly, include a HANDS-FREE MOLDED SHOE ("HFMS").

SUMMARY

Embodiments of a HANDS-FREE MOLDED SHOE may include a uniformly molded slip-on shoe having features to facilitate hands-free wearing. Such features may include use of a greater hardness plastic in a heel counter portion of the shoe and lesser hardness plastic in an upper and/or sole portion of the shoe. The heel counter portion may be configured to deform into a new configuration under the load of a user's foot as it enters a shoe opening, and return to its original configuration once the foot is inside the show. The heel counter portion may further have an S-wave shaped vertical cross section at a rearmost position. Methods of manufacture of a HFMS may include the use of an upper insert and a sole insert as well as a heel insert having a securing mechanism to secure the heel insert to a core portion of a shoe mold.

In one embodiment, an article of footwear as discussed herein may comprise: a sole structure; a heel cup uniformly molded with the sole structure, and extending from the sole structure to at least a portion of the rear heel collar of an upper; the heel cup uniformly molded with an upper portion, midportion, and lower portion wherein the upper portion has a smaller mediolateral length than the midportion, and the midportion and lower portion form a concave structure configured to receive the heel; the upper portion having a first configuration; the upper portion capable of distorting into a second configuration under a load of a user's foot when the user is donning the footwear; and wherein in the second configuration at least part of the upper portion is lowered relative to the first configuration; the upper portion capable of returning to the first configuration after the load of user's foot is removed.

In another embodiment, an article of footwear as discussed herein may comprise: a uniformly-molded upper, sole, and heel cup; wherein the heel cup is comprised of a first plastic and the upper is comprised of a second plastic, the first plastic having a different hardness than the second plastic.

In another embodiment, an article of footwear as discussed herein may comprise: a uniformly-molded sole and heel cup; wherein the heel cup is comprised of a first plastic and the sole is comprised of a second plastic, the first plastic having a different hardness than the second plastic.

In another embodiment, a method for manufacturing an article of footwear as discussed herein may comprise: placing a substrate insert into a first shoe mold, wherein the substrate insert comprises a heel insert; providing a first plastic to the first shoe mold to yield a substrate; placing the substrate and an overmold insert into a second shoe mold; and providing a second plastic to the second shoe mold to yield a shoe, wherein the first plastic has a greater hardness than the second plastic.

In another embodiment, an apparatus for manufacturing an article of footwear may comprise: a shoe mold; an upper insert; a sole insert; and a heel insert comprising a securing mechanism for affixing the heel insert to a core of the shoe mold.

BRIEF DESCRIPTION OF THE DRAWINGS

The accompanying appendices and/or drawings illustrate various non-limiting, example, inventive aspects in accordance with the present disclosure:

FIG. 11C is a perspective view of the heel counter of FIG. 11A;

FIG. 11D is a cross-sectional view of the heel counter incorporating a rigid heel cup;

DETAILED DESCRIPTION

The HANDS-FREE MOLDED SHOE and methods for manufacture thereof ("HFMS") that are disclosed herein comprises, in various embodiments, uniformly molded shoes, footwear, and/or the like that temporarily under the load of a wearer's foot to accommodate hands-free foot insertion.

In some embodiments, the HFMS may comprise a uniformly molded upper, sole, and heel cup, wherein the heel cup is composed of a plastic having a different (e.g., greater) durometer, elasticity stiffness, density, and/or hardness than that of either or both of the upper and sole. The use of different plastics may also allow for these different portions of the HFMS to have different colors and/or other material properties.

In some embodiments, a heel cup of the HFMS may be configured to distort from a first configuration in its native state to a second configuration under a load of a user's foot when the user is donning the footwear. Once the user's foot is inserted into the shoe, the heel cup may return to its uncompressed state.

In some embodiments, a rearmost portion of a heel cup of the HFMS may have an overall vertical cross-sectional shape that resembles approximately an S-wave. In some implementations, an amplitude and/or width of an arc of the upper portion of the S-wave may be different than an amplitude and/or width of a lower arc of the lower portion of the S-wave. In some implementations, the S-wave may exhibit thickness variations in a vertical direction, with a greater cross-sectional thickness at a top and/or bottom of the S-wave than at a middle portion (e.g., at or near an inflection point of the S-wave).

In some embodiments, methods of manufacturing a HFMS may include a process of injection co-molding, overmolding, and/or foaming, utilizing same or different elasticity/hardness plastics that are fused during the molding process, as well as different molds, baby molds, and/or the like. For example, a method may include providing three separate baby molds, one for each of the sole, upper and/or instep, and heel cup, for an injection molding process. In alternative embodiments, a HFMS may include a process of pellet pouring to supply one or more plastics for the HFMS.

An HFMS and/or HFMS manufacturing process may include plastics such as, but not limited to, ethylene-vinyl acetate (EVA), compression-molded EVA (CMEVA), Pylon™, Thermoplastic Polyester Elastomer (TPEE), Thermoplastic Polyurethane (TPU), RB foam, rubber, and/or other thermoplastics, elastomers, thermoplastic elastomers, and/or the like, and/or combinations thereof. For example, in one implementation, a heel cup and/or outsole portion of a HFMS may be comprised of TPEE. In another implementation, a midsole portion of an HFMS may be comprised of EVA, CMEVA, and/or the like. In another implementation, an outsole portion and/or heel cup portion may be comprised of TPU. In another implementation, an outsole portion may be comprised of a mixture of RB foam and EVA (e.g., about 84.8% RB foam and 15.2% EVA).

Figure 1:
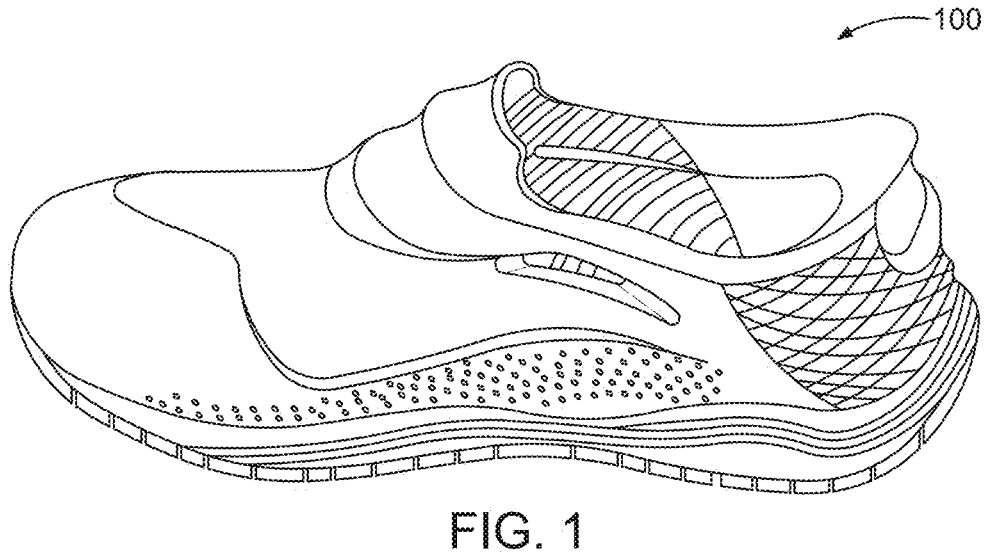
FIG. 1 shows an example of a shoe, which may be uniformly molded of one or more plastic materials, and may comprise a sole and an upper in one embodiment of a HFMS.
Figure 2:
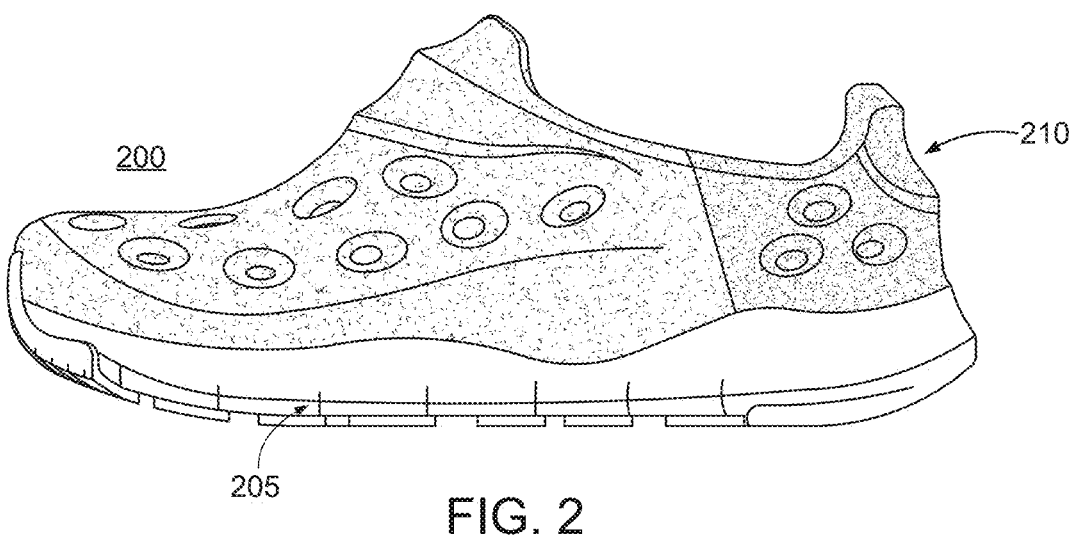
FIG. 2 shows upper, sole, and heel counter portions in one embodiment of a HFMS.

FIG. 1 shows an example of a shoe, which may be uniformly molded of one or more plastic materials, and may comprise a sole and an upper. This is further illustrated in FIG. 2, showing upper 200 and sole 205, as well as a heel counter portion 210. The sole 205 may comprise an outsole, a midsole, and/or an integrally formed outsole and midsole, The upper 200 may comprise a toe box, a vamp, a tongue, a medial quarter, a lateral quarter, and a heel counter 210. The shoe has a forefoot portion, a rear portion, a medial side and a lateral side. The upper may comprise an exterior layer, interior layers or interior structure, and/or an inner lining. The upper may form a shoe opening that is capable of receiving a user's foot when the user is donning the shoe.

The heel counter or rear portion of the upper may comprise a structure(s) that enables easier insertion of the foot into the shoe opening. The structure(s) may also support easier removal of the foot. The heel counter or rear portion of the upper may further have a transient widening when the user is donning or removing the shoe. The widening of the shoe opening may be initiated by the user placing a load on the heel counter or rear portion of the upper that may be exerted by the user's foot with minimal to no assistance by the user's hands. In other embodiments of the invention, the heel counter may be compressible when placed under sufficient load and return to its uncompressed stated. The lowering of the heel counter may also allow easier insertion of the user's foot. Once a foot is inserted into the shoe, the heel counter may have a compressible layer, such as a foam component, that secures or enhances securement of the foot during user's normal wear of the shoe.

Figure 3:
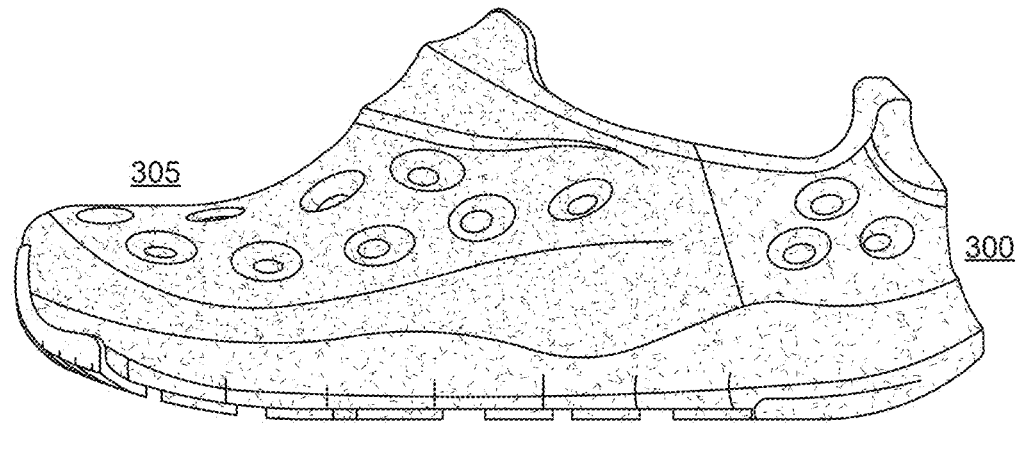
FIG. 3 shows an implementation in which the heel counter and sole are comprised of a harder plastic material than the plastic material used for the upper in one embodiment of a HFMS.

In various embodiments, the heel counter and/or heel cup may be comprised of a plastic material with a different (e.g., greater) hardness than either or both of the upper and sole. For example, FIG. 3 shows an implementation in which the heel counter and sole 300 are comprised of a harder plastic material than the plastic material used for the upper 305. In some embodiments, one or more portions of the shoe may be made of other materials and/or may not be made of plastic at all. For example, in one implementation, a sole and heel cup may be uniformly molded plastic while the upper is comprised of mesh fabric, synthetic fabric, nylon, suede, and/or the like.

Figure 4:
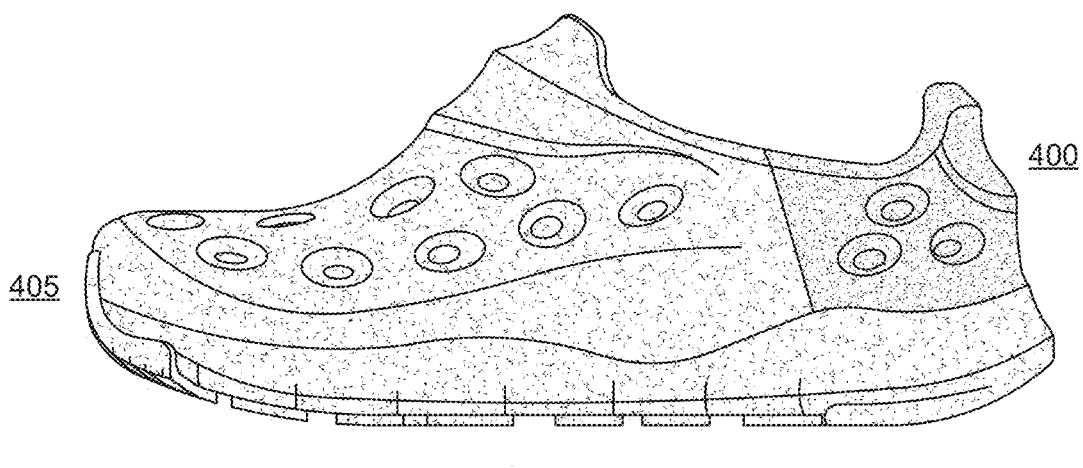
FIG. 4 shows an implementation in which the heel counter is comprised of a harder plastic material than the plastic material used for the upper and sole in one embodiment of a HFMS.

In another example, FIG. 4 shows an implementation in which the heel counter 400 is comprised of a harder plastic material than the plastic material used for the upper and sole 405. The relative hardness or softness of the plastic material may be characterized according to various metrics, including but not limited to an elasticity, stiffness, density and/or durometer reading, value, and/or measurement.

In various implementations, the plastic material used for the upper, sole, and/or heel counter may be comprised of one or more polymer foams. Polymer foams, also referred to as foamed, expanded, or sponge plastics, may, in some implementations, consist of a minimum of two phases, a solid polymer matrix, and a gaseous phase derived traditionally from a blowing agent. The solid polymer phase may be inorganic, organic, or organometallic. The solid polymer phase may include more than one solid phase, which can be composed of a polymer blend based on two or more polymers; an interpenetrating polymer network, which can consist of at least two crosslinked polymer networks; or a pseudo interpenetrating polymer network from a combination of at least one or more linear polymers with crosslinked polymers not linked by covalent bonds. Polymer foams may include, but are not limited to: ethylene vinyl acetate (EVA) foam, low-density polyethylene (LDPE) foam, nitrile rubber (NBR) foam, polychloroprene foam, polyimide foam, polypropylene (PP) foam, polystyrene (PS) foam, polyurethane (PU) foam, polyethylene foam, polyvinyl chloride (PVC) foam, silicone foam, and microcellular foam.

Polymer foams may be flexible or rigid, which may depend on whether their glass transition temperature (Tg) is below or above room temperature. The Tg depends upon chemical composition, degree of crystallinity, and degree of crosslinking. Polymer foams can be described as closed cell or open cell foams. In closed cell foams, the foam cells are isolated from each other and cavities are surrounded by complete cell walls. In open cell foams, cells are connected to each other. Cell geometry, size, and shape affect the foam properties.

Polymer foams can be produced in a variety of densities, ranging from approximately 1.6 kg/m3 to over 961 kg/m3. Foam density is generally proportional to its mechanical-strength properties. EVA foams (e.g., as may be used in sole components) may have an Asker C hardness of 15 to 80 with densities that range from 0.033 g/cm3 to 0.28 g/cm3. Some of these EVA foams used in sole components have a resiliency of 40% to 60%.

Polymer foams can be produced by either mechanical, chemical, or physical means. Chemical blowing agents may include reactive species that decompose and give off a high gas volume in the foaming process. Examples include azodicarbonamide, 5-pheyltetrazole, and triazoles. Physical blowing agents may include inert gases or low boiling liquids which volatilize during the foaming process. Examples of inert gases used include argon, nitrogen, and carbon dioxide. Examples of low boiling liquids include alkanes (butanes and pentanes) and compounds containing chlorine and/or fluorine. Additives may be added to promote nucleation for a blowing agent, and/or a more uniform pore/cell size distribution. Various methods involving the use of blowing agents may be incorporated into an Injection Phylon process.

The use of supercritical fluid (SCF), including compounds that do not participate in atmospheric photochemistry, as a physical blowing agent has several advantages. One advantage of using such SCFs lacking photochemical reactivity, as compared to using volatile organic compounds (VOCs) and ozone depleting substances (ODSs), includes reduced harm to the environment. SCFs also provide more cost effective and safer alternatives from other foaming or extracting agents. The use of SCFs in foaming processes improves impact strength and toughness of the resulting foam products. The resulting foam product may also have improved surface appearance, a low dielectric constant, improved thermal insulation, and greater mechanical properties. Such foams may provide for both savings on material and weight reduction. SCFs also have a higher diffusion rate than traditional blowing agents.

Three-dimensional foaming materials having a greater pre-expanded size or thickness using SCF expansion can result in varied curing and non-uniform expansion of cells within the material. This may result in a sole component that has varying degrees of hardness, density, resilience, and bonding to other components which may be desired in some embodiments, but detrimental to others. Conducting post compression molding may further modify such physical properties. Furthermore, a three-dimensional SCF foamed material may be incorporated with other components to produce a composite footwear.

Referring to the embodiments of FIGS. 5-10B a heel counter 32 may comprise a compressible heel cup 52 which may be a heel counter and/or an interior component thereof, connected to the upper, such that the heel cup 52 makes contact with the foot.

Figure 5:
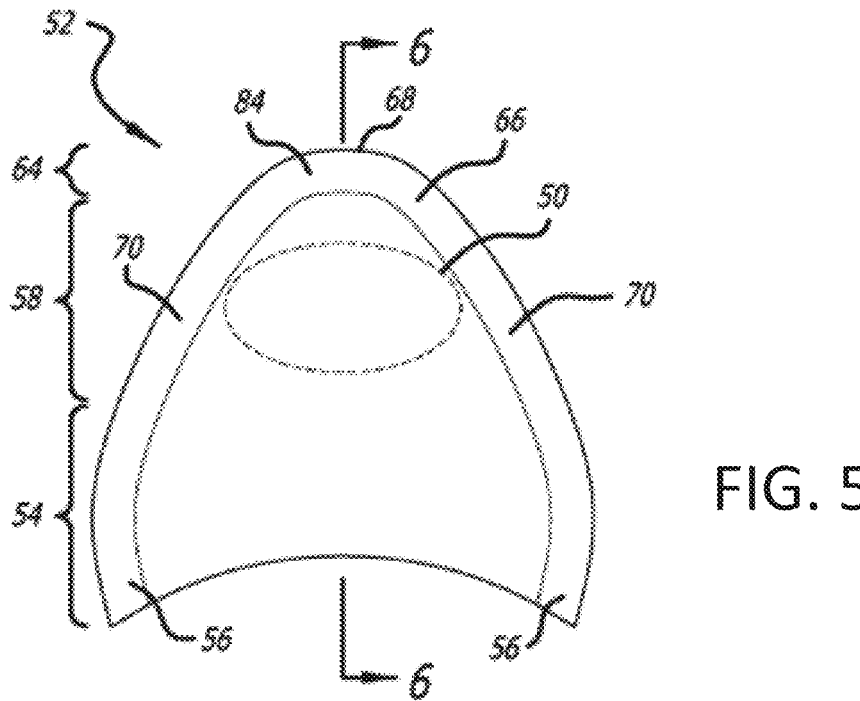
FIG. 5 shows a front view' of a compressible heel cup in one embodiment of the HFMS.
Figure 6:
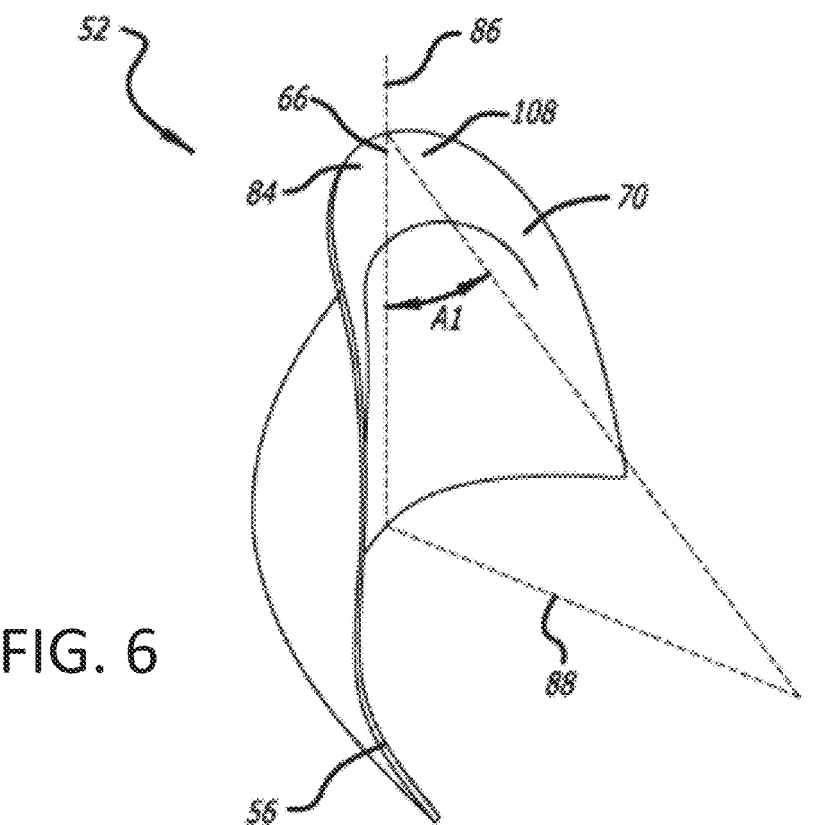
FIG. 6 shows a perspective view of the compressible heel cup of FIG. 5.
Figure 7:
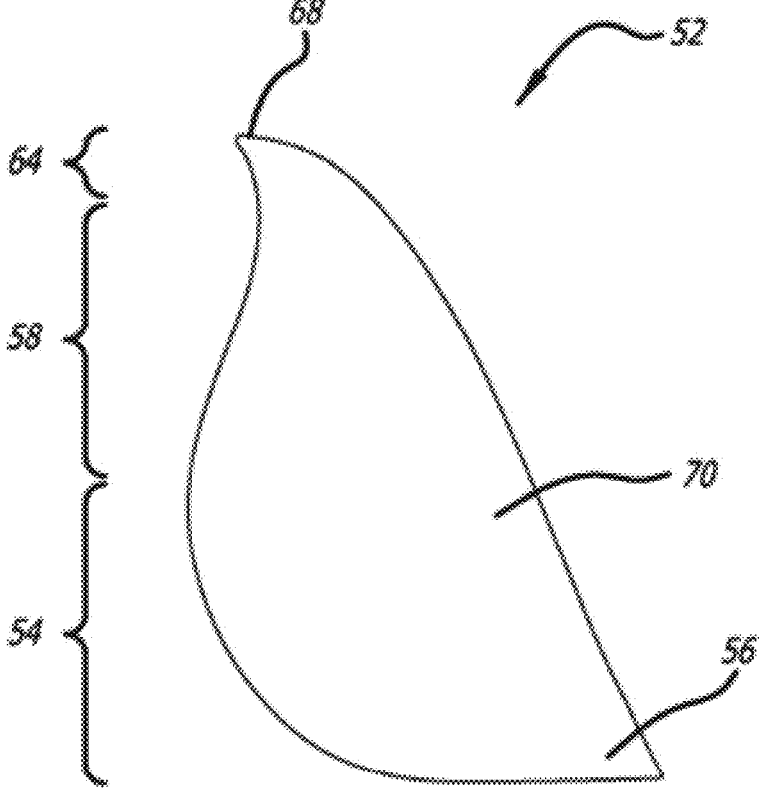
FIG. 7 shows a side view of the compressible heel cup of FIG. 5.

Referring to the exemplary embodiment of FIGS. 5-8D, the heel cup 52 may, in various implementations, have a shape substantially corresponding to a heel covering and, e.g., having a profile resembling a pear-like shape. The heel cup may have a mediolateral width near the heel cup collar 84 that is less than the mediolateral width of the lower portion 54 as shown in FIGS. 5-6

As shown in FIG. 6, the inner wall 66 of the upper portion 64 of the heel cup at the rearmost portion of the heel cup may have a downward incline, e.g., of between 0 to 90 degrees relative to a vertical line 86 that is normal to the horizontal surface 88 of the floor. In this exemplary' embodiment, the upper portion 66 may have a downward incline of 30 degrees. The inner wall 66 of the upper portion 64 of the heel cup 52 may also have a convex curvature facing toward the shoe opening 48. The top portion of the convex curvature has the downward incline A1 of 30 degrees. The lower portion of the convex curvature extends just above the portion of the heel cup 52 that receives the heel. The lower portion of the convex curvature may have a downward incline less than the downward incline of A1 and gradually decreases as it approaches an incline equal to the vertical line 86. The heel cup 52 may have a concave curvature that surrounds the rear portion of the heel. The medial and lateral sides of the heel cup 52 may also extend and form support of part of the quarter and even as far as the vamp. The thickness of the heel cup 52 may be reduced at various locations. The top edge line 88 may have a tapering of the inner surface of the heel cup 52 and outer surface of the heel cup 52. The heel cup 52 may have increased thickness T1 along the other perimeter edges, such as 2 to 3 mm. In another exemplary' embodiment, the thickness T1 may be reduced in certain areas to provide greater flexibility to the heel cup 52 when donning or removing the shoe. In one embodiment, the thickness T1 of the heel cup 52 may decrease gradually from a peripheral portion 70 forming an area at the periphery of the heel cup 52 toward the central portion or region 50 of the mid-portion 58. In one implementation, the minimum thickness T1 in the central region 50 of the mid-portion 58 may be approximately, but not limited to $\frac{1}{4}$ to $\frac{1}{6}$ the thickness relative to the thickest portions at the periphery of heel cup 52, such as 0.5 to 1 mm. The thickest region of the top portion may be greater than the thickest region of the bottom portion. The reduced thickness T1 of the central region of the mid-portion 58 may allow for the heel cup 52 to compress under sufficient load. In an alternate embodiment, the thickness T1 may be reduced across the entire mediolateral portion or in multiple regions such as regions in the mid-portion 58 and/or regions of the upper portion 64. The thinner regions may provide increased flexibility and bending of the heel cup 52 which provides compressibility under the load of a user's foot such as during the donning of a shoe. Such compression may allow the upper portion 64 and/or the mid-portion 58 of the heel cup 52 to move rearward and widen the shoe opening 48 to allow easier entry of the foot. The heel cup 52 may distort from a first configuration in its native state, to a second configuration under a load of a user's foot when the user is donning the footwear. For example, the heel cup 52 may be partially compressed such that the upper portion 64 and/or mid-portion 58 of the heel cup 52 is lowered sufficiently to allow the insertion of the user's foot. Once the user's foot is inserted into the shoe, the heel cup 52 may return to its uncompressed configuration.

Figure 8A:
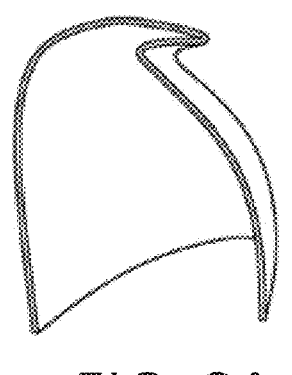
FIGS. 8A-8B show a side-by-side perspective view of the compressible heel cup of FIG. 5 in its compressed configuration (8A) and its uncompressed configuration (8B)
Figure 8B:
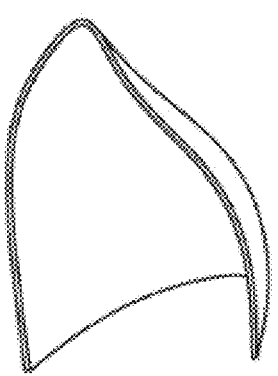
Figure 8C:
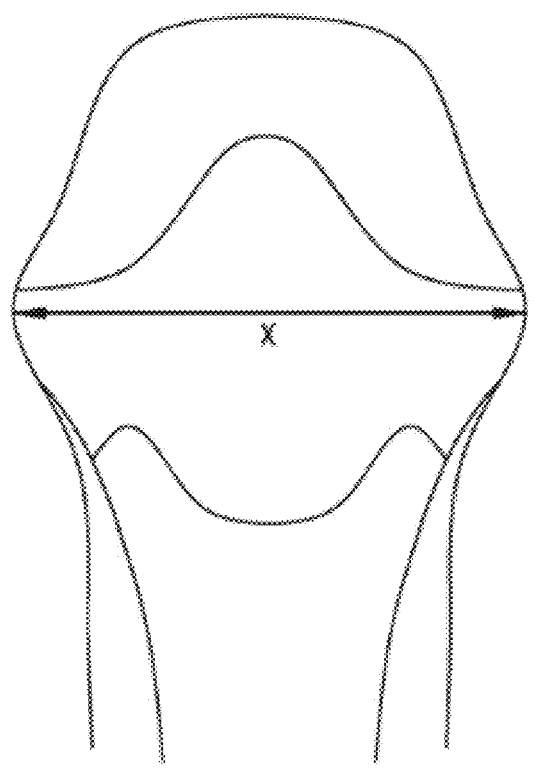
FIG. 8C-8D show a side-by-side top view of the compressible heel cup of FIG. 5 in its compressed configuration (8C) and its uncompressed configuration (8D)
Figure 8D:
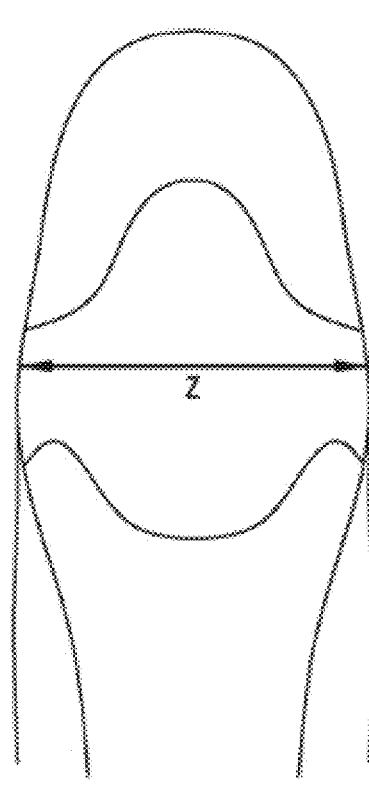

Further to this embodiment, when a user dons the shoe, the top portion of the convex curvature of the heel cup 52 or the uppermost segment of the heel counter of the shoe may be lowered and extend backward away from the foot as the heel counter is compressed as shown in FIG. 8A. This action allows the user's foot to be inserted into the shoe opening 48 with a reduced degree of plantar flexion. During compression of the heel cup 52, portions of the heel cup 52 may move forward toward the direction of the forefoot portion. The distortion of the heel cup 52 may include the heel counter widening with the medial and lateral sides of the heel cup moving outward thereby widening the opening of the shoe. The mediolateral widening of the shoe opening 48 allows easier entry such as easier insertion of the forefoot portion of the user's foot. In one exemplary embodiment, the shoe opening of 7.5 cm may widen up to 4 cm or about 50%. See FIGS. 8C and 8D. The widening may be less or more depending on the size of the shoe and the flexibility of the heel cup. In some shoes, the desired widening may be less or greater depending on the needs of securement and use.

In an exemplary embodiment of the heel cup 52 as shown in FIGS. 5-8D, the thickness T1 of a heel cup 52 may range from 0.4 millimeters to 4 millimeters. The range of thickness T1 of the heel cup may be thinner or thicker at various regions depending on the desired elastic and durable properties of the material. For example, the midpoint region may be thinner than the surrounding regions, and in particular a central portion may be thinner as shown in FIG. 10B. The central portion may be spaced away from the medial and lateral edges wherein the peripheral edges may have a greater thickness. Other suitable materials may include other thermoplastic elastomers or other polymers for providing the compressible characteristics of the heel cup, including but not limited to ethylene-vinyl acetate (EVA), compression-molded EVA (CMEVA), Pylon™, Thermoplastic Polyester Elastomer (TPEE), Thermoplastic Polyurethane (TPU), RB foam, rubber, and/or other thermoplastics, elastomers, thermoplastic elastomers, and/or the like.

Figure 9:
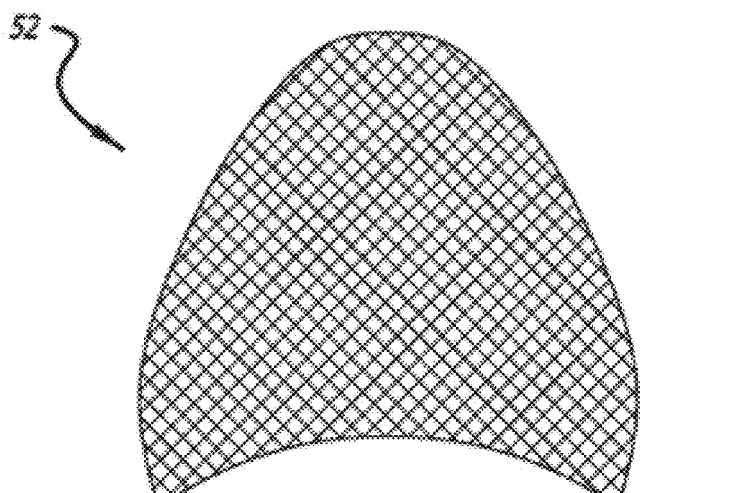
FIG. 9 shows a front view of a heel cup configured to have a series of crisscross beams.

In another embodiment, the heel cup may be configured to have a series of crisscross beams that form an egg crate like configuration. FIG. 9 shows an embodiment with beams that are in a diagonal configuration. In an alternate embodiment, the beams may also be in a vertical and lateral configuration. The apertures between the beams may be approximately uniformly sized. The beams may be uniform in dimensions or vary in thickness and width. Beams that are thinner or less wide may be used to enhance flexibility and compressibility in designated locations while thicker or wider beams provide varying degrees of rigid support. For example, the beams may be thinner in the mid-portion, and in particular, the central portion of the mid-portion that is spaced away from the edges. The surrounding beams may be thicker than the central portion. The central portion may allow for greater flexibility' in order to distort under a load.

Figure 10A:
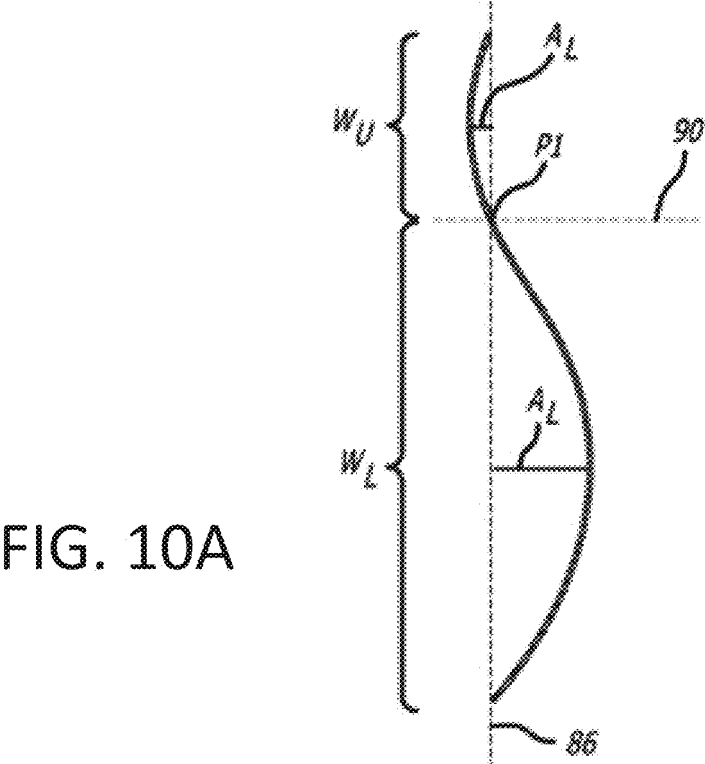
FIG. 10A shows a schematic illustration of a cross-section of arc lengths of the rearmost portion of the heel cup of FIG. 5.
Figure 10B:
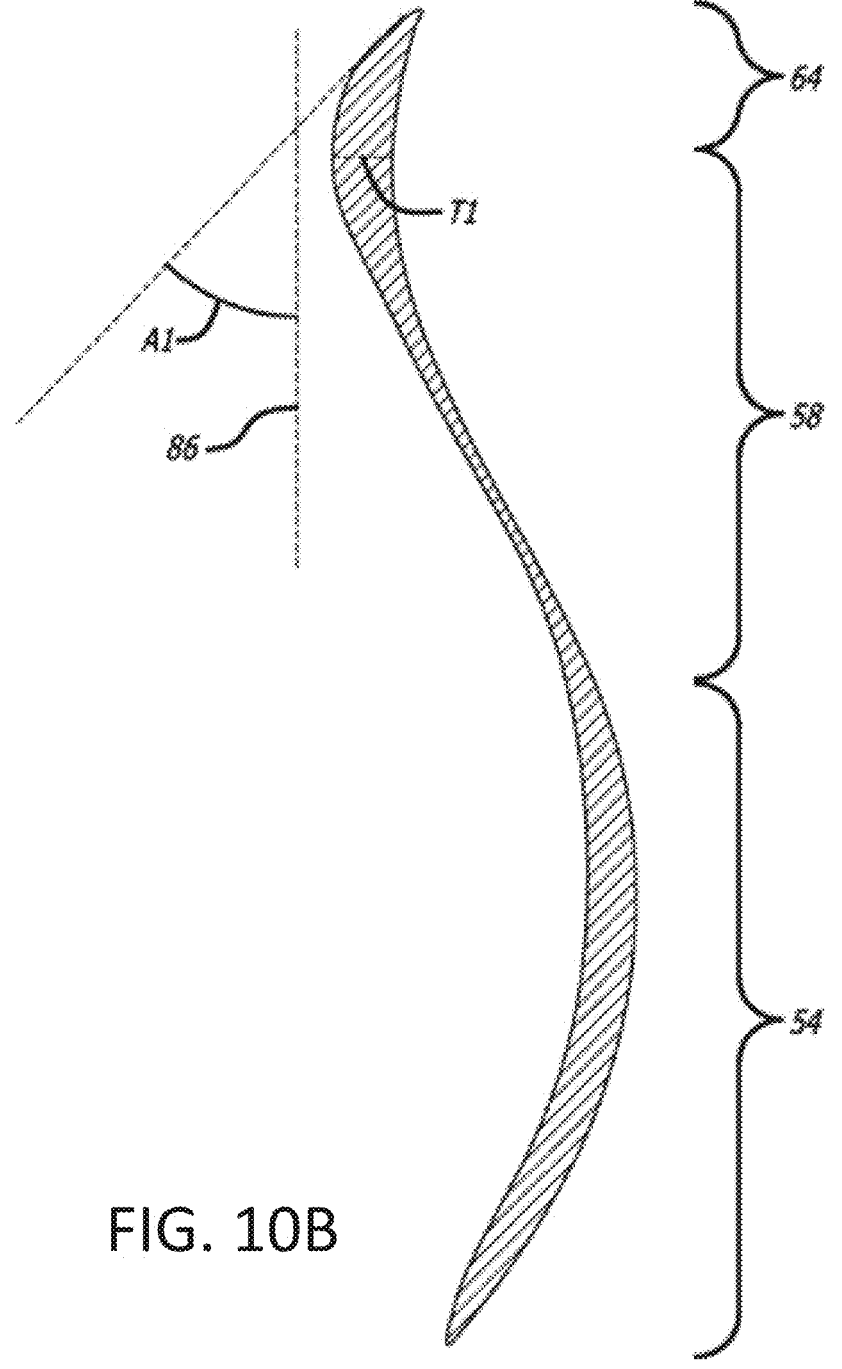
FIG. 10B shows a cross-sectional view of the heel cup of FIG. 5 taken at lines 6-6.

In an embodiment, the rearmost portion of the heel cup 52 may have an overall vertical cross-sectional shape that resembles approximately an S wave as shown on a cross-sectional diagram of FIG. 10A. The upper and lower portions of the S wave may be differentiated at the point P1 through a horizontal plane, e.g. the midline 90, which is drawn between the upper arc and lower arc ends of the S wave and intersects the heel counter 52 and the inflection point of the S wave. The amplitude (A) and width (WU) of arc of the upper portion of the S wave may be different than the amplitude (A) and width (WL) of the lower arc of the lower portion of the S wave. In the exemplary embodiment, the WU is approximately 0.44 times that of the WL. The A is approximately ⅓ that of the A. In one possible embodiment, the WU is approximately 2 centimeters and the BL is approximately 4.5 centimeters. The Au is roughly 3 millimeters and the A is roughly 9 millimeters. The S configuration decreases both in AU/AL and WU/WL in the cross-sections in the areas extending from the rearmost portion's cross-section of the heel cup 52 and may only consist of the lower portion arc along the medial and lateral sides of the heel cup 52. The measurements at the rearmost portion of the heel cup 52 of the exemplary embodiment are intended to be exemplary. In some implementations, a vertical thickness variation of the heel counter and/or heel cup may include thicker portions at a top and bottom of the S-wave and a thinner portion near the inflection point.

The central region of the mid-portion of the heel cup may have a single aperture or a plurality of apertures. Just as the central region of the mid-portion may be constructed with less material than the maximum thickness of the collar and/or the maximum thickness of the base, the central region of the mid-portion of the heel cup may be constructed with greater flexibility than the periphery. The resulting effects of the central region comprising a single aperture, a plurality of apertures, a lesser thickness, and/or a material of greater flexibility, may serve to facilitate entry and removal of the user's foot from the shoe.

Figure 11A:
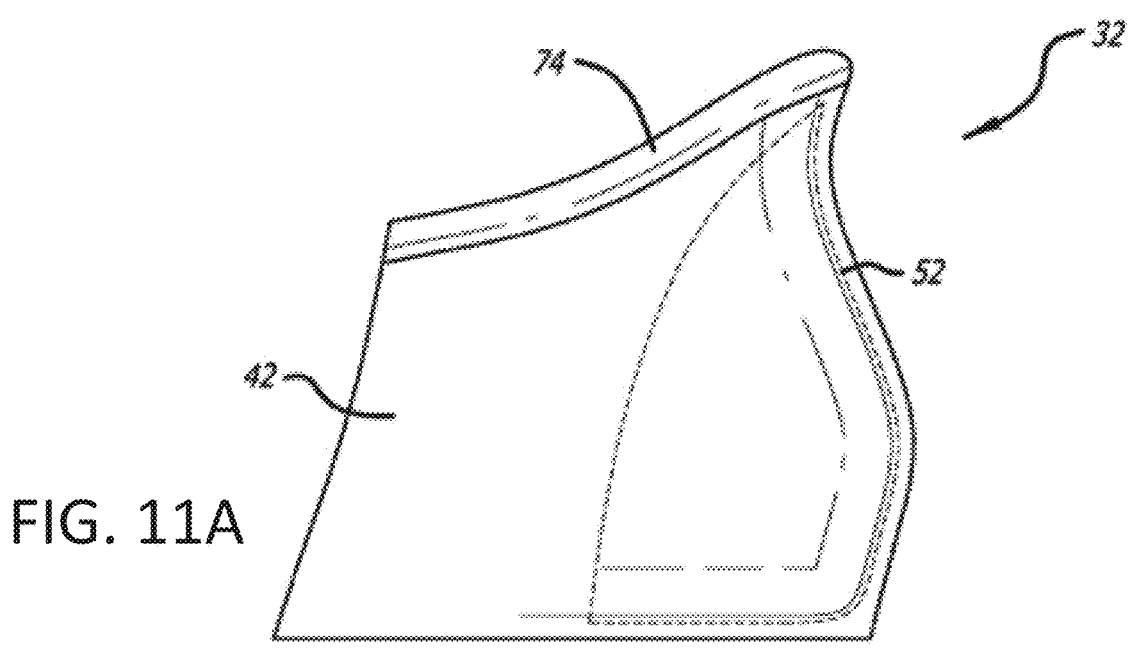
FIG. 11A is a side view of a heel counter with a heel cup located in the interior of the heel counter.
Figure 11B:
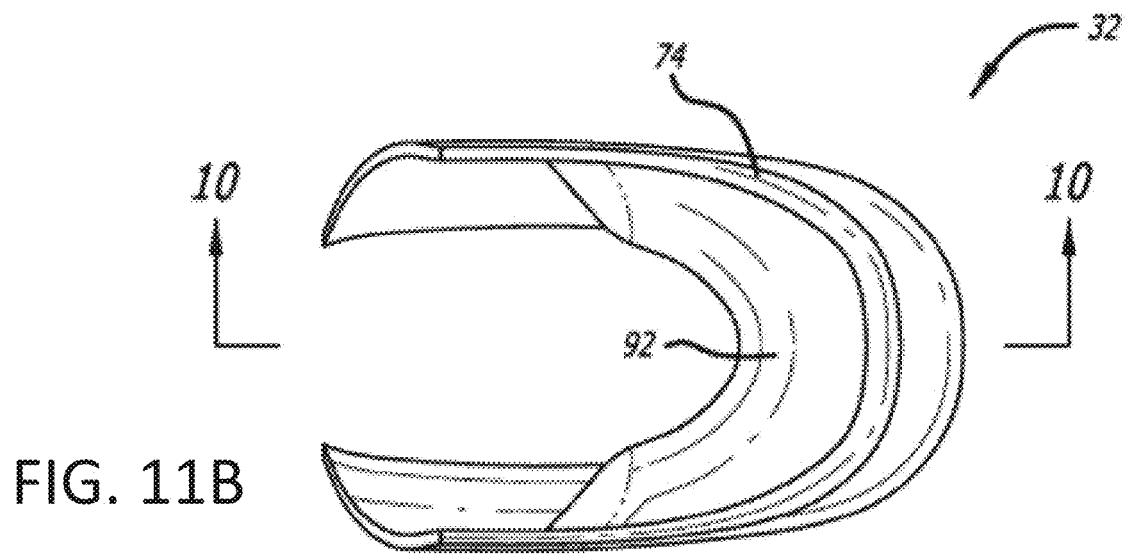
FIG. 11B is a top view of the heel counter of FIG. 11A.

Further to the exemplary' embodiment, the heel cup 52 may integrated with and/or be attached at least to an interior foam layer 92, as shown in FIGS. 11A-11D. In some implementations, the foam layer may be molded integrally with and/or made from the same plastic as the heel cup. The heel cup 52 may be located in the interior of the heel counter 32 of the upper 16 as shown in FIGS. 11B-11D. The foam layer 92 may line both the inner wall 66 of the heel cup 52 and outer wall of the heel cup 52. Around the upper portion and mid-portion, the foam layer 92 may protrude and extend further into the shoe opening 48. The foam layer 92 may be thicker at or adjacent to the upper portion 64 and mid-portion 58 of the heel cup 52 thereby forming part of the cuff of the shoe opening 48. The thicker foam layer 92 may provide securement of the user's foot once inserted within the shoe 12 as the foam would be located above the calcaneus bone region of the user's foot and extend around at least portions of the ankle region of the foot. Since the foam is compressible, the foam may be compressed by the heel during foot insertion or removal and hold the ankle of the user's foot once the foot is inserted.

The heel cup may have a lower portion that forms a heel cup configured to receive the heel of the foot. The lower portion of the heel cup may further have side extensions around both the medial side and lateral side. The heel cup may have a mid-portion located above the lower portion of the heel cup and that curves inward above the heel bone or may be composed of an aperture. The heel cup may have an aperture located at the rear of the heel cup. Further to this embodiment, the heel cup may be a rigid heel cup constructed of a substantially incompressible material under the load of the foot.

The upper portion of the heel cup may be configured with a smooth curvature extending from the top edge of the heel cup curved downward towards the shoe opening 48. The inner wall of the upper portion has an overall downward incline that extends from the curved top edge of the upper portion toward the interior of the upper 16. The inner wall of the upper portion may have dimensions akin to a shoehorn such that the smooth curvature and angle of the downward incline of the upper portion allows the heel of the foot to slide into the shoe 12 with greater ease. The heel cup may be constructed of a rigid material that does not substantially compress under the load of the user's foot. In an alternate embodiment, the heel cup may have some flexibility such that the upper portion of the heel cup may have some slight flexibility sufficient to bend downward and away from the shoe opening and/or widen the shoe opening 48 for easier foot insertion and/or removal.

Foam material or any inner lining material(s) known in the art may be used as an inner compressible layer of the upper 16. The foam material 76 may be integrally molded with and/or bonded to the inner surface of the heel cup 52 to provide cushioning, e.g., against the rigid heel cup material. The thickness of the foam material may be uniform or vary at certain locations depending on the desired cushioning or support to the foot. In one exemplary embodiment, thicker foam material may be located at the inner wall 66 of the upper portion 64 and may further extend at least a portion along the mediolateral length of the inner wall 66. The foam material may be configured to curve around at least a portion of the ankle above the heel when the shoe 12 is worn similar to the foam material configuration shown in FIG. 11D. In this embodiment, the user's foot may compress the foam material during foot insertion. Following foot insertion, the foam material may expand to its fully uncompressed state or partially expand thereby improving the security' of the foot within the shoe 12. A thinner foam material may be used to line the other portions of the heel cup 52.

Figure 12:
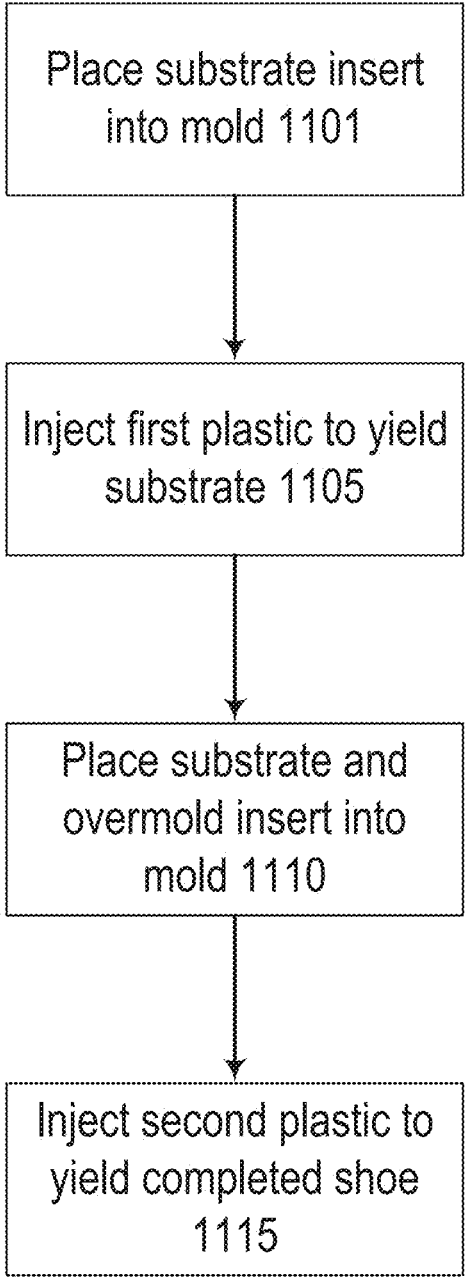
FIG. 12 shows an example of logic flow for a method of manufacturing a HFMS in some embodiments.

FIG. 12 shows an example of logic flow for a method of manufacturing a HFMS in some embodiments. A substrate insert may first be placed into a first HFMS mold 1101. In one implementation, the substrate insert may comprise an upper and/or instep insert. In another implementation, the substrate insert may comprise both an upper and/or instep insert and a sole insert. A first plastic (e.g., having a first hardness, a first color, and/or the like) may then be injected to yield a substrate 1105. In one implementation, the substrate insert may then be removed from the HFMS mold. The substrate and an overmold insert may then be placed in the same or a different HFMS mold 1110. In an implementation wherein the substrate mold comprises an upper and/or instep insert, the overmold insert may comprise both a heel insert and a sole insert. In an implementation wherein the substrate mold comprises both an upper and/or instep insert and a sole insert, the overmold insert may comprise a heel insert. A second plastic (e.g., having a second hardness, second color, and/or the like) may then be injected to yield the HFMS 1115. In one implementation, the second hardness may be greater than the first hardness, such as may be measured by a durometer reading, value, measurement, and/or the like. In alternative implementations, the heel insert (with or without sole insert) may be utilized in the mold first, with its corresponding plastic injection, and the overmolding performed with the upper and/or instep insert (with or without sole insert) and its corresponding plastic injection.

In alternative embodiments, a process of pouring plastic pellets into one or more molds, baby molds, and/or the like may be employed in connection with HFMS manufacturing. For example, in one implementation, an HFMS mold may comprise a midplate and bottom plate. The molds may be cleaned and then one or more types of plastic pellets may be poured into each of the midplate and bottom plate (e.g., the same pellets in both or different pellets in each). One or more hot press stages may then be implemented (e.g., 30 seconds or less of a first hot press, followed by approximately 20 minutes of a second hot press) to form the HFMS.

In some implementations, an upper, heel, and sole may all be handled separately for injection molding, foaming, pellet pouring, and/or the like. In other implementations, one or more components of an HFMS (e.g., sole and upper, heel and upper, sole and heel) may be handled together for injection molding, foaming, pellet pouring, and/or the like.

In various implementations, an HFMS may include a single hardness plastic, dual hardness plastics, or multiple hardness plastics. For example, in one implementation, a heel may have a first hardness plastic (e.g., at or approximately 60 C, via a Shore C durometer reading) and an upper and sole may have a second hardness plastic (e.g., at or approximately 40 C). In another implementation, a heel may have a first hardness plastic (e.g., at or approximately 52 C) and an upper and sole may have a second hardness plastic (e.g., at or approximately 45° C.). In another implementation, an entire HFMS may have a single hardness plastic (e.g., at or approximately 50 C, 55 C, 38-40 C, or the like).

Figure 13A:
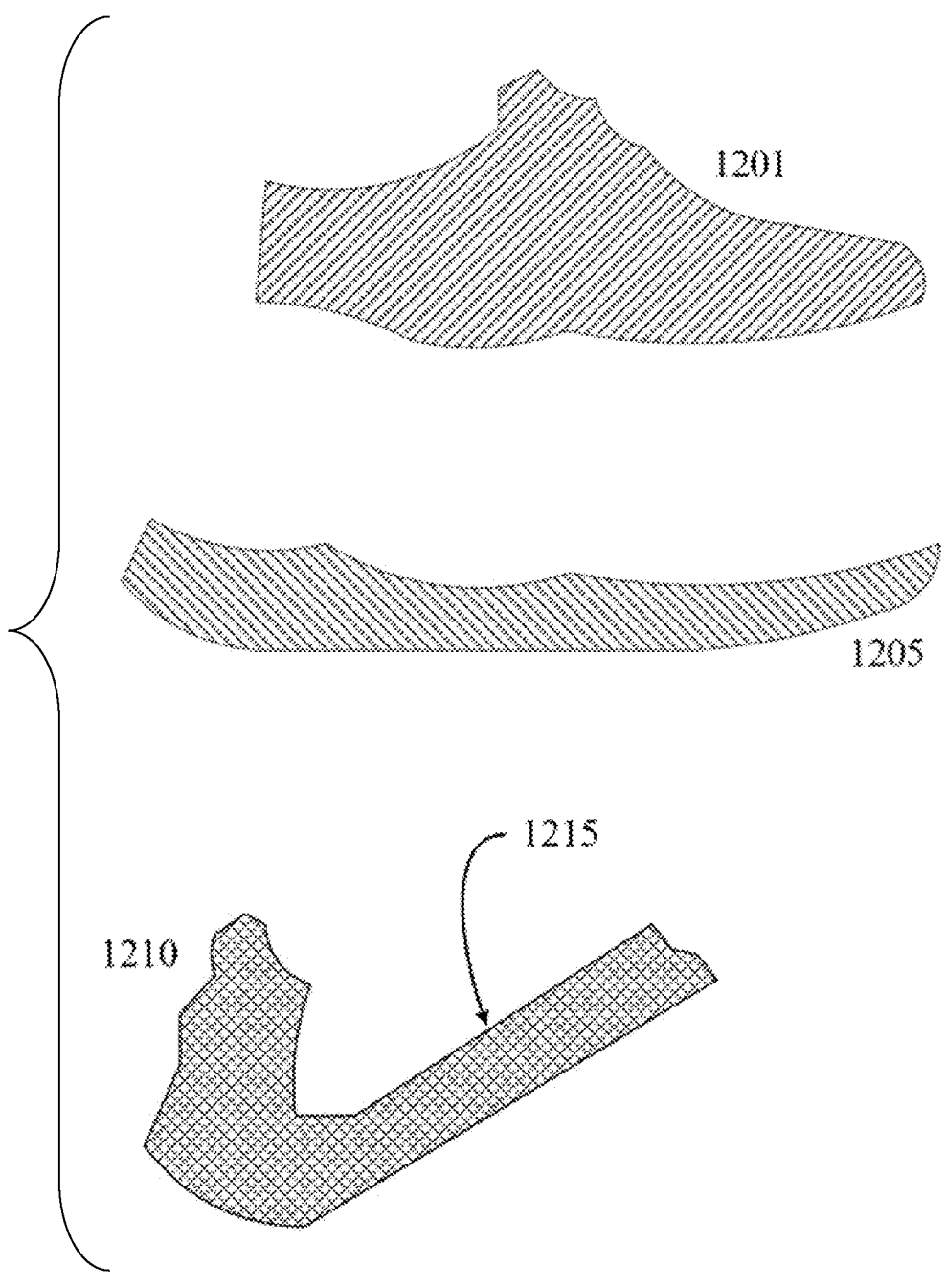
FIGS. 13A-13B show an example of inserts usable in a molding process of the HFMS in some embodiments.
Figure 13B:
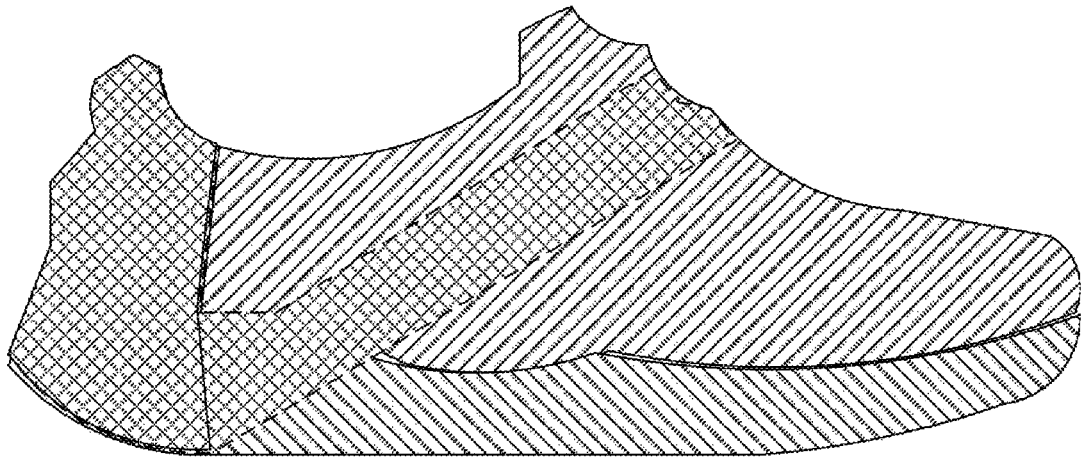

FIGS. 13A-13B show an example of inserts usable in a molding process of the HFMS in some embodiments. These may include an upper and/or instep insert 1201, a sole insert 1205, and a heel insert 1210. The heel insert may include a securing feature 1215 to allow the heel insert to be secured to a core (e.g., a last) of the mold. In one implementation, the securing feature 1215 may comprise an instep strap configured to extend over and/or around an instep of the core, last, and/or the like. In alternative implementations, the securing feature 1215 may comprise a strap configured to extend over and/or around other portions of the core, last, and/or the like, such as the toe region, a front of the instep, a back of the instep, and/or the like. In some implementations, the instep strap may be adjustable, such as by having a variable length, width, tension, angle relative to the heel portion, and/or the like. In some implementations, the instep strap may be constructed of a different material than the heel portion, such as a different plastic (e.g., with a different hardness, elasticity, and/or the like), ribbon material, metal, cloth, polyester, and/or the like. In alternative implementations, the securing feature 1215 may comprise a partial strap, clip, ribbon, string, fastener, and/or the like. FIG. 13B shoes the upper and/or instep insert 1201, sole insert 1205, and heel insert 1210 in assembly to form the shape of a HFMS.

Figure 14B:
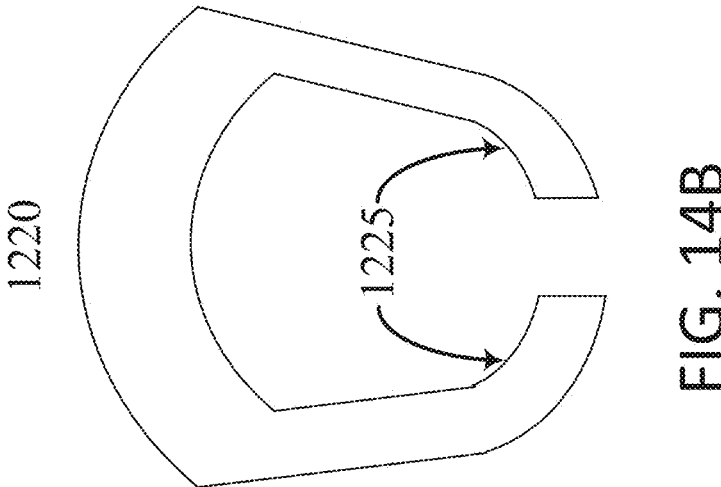
FIGS. 14A-14B show examples of a top view for heel inserts for use in some embodiments of the HFMS.
Figure 14A:
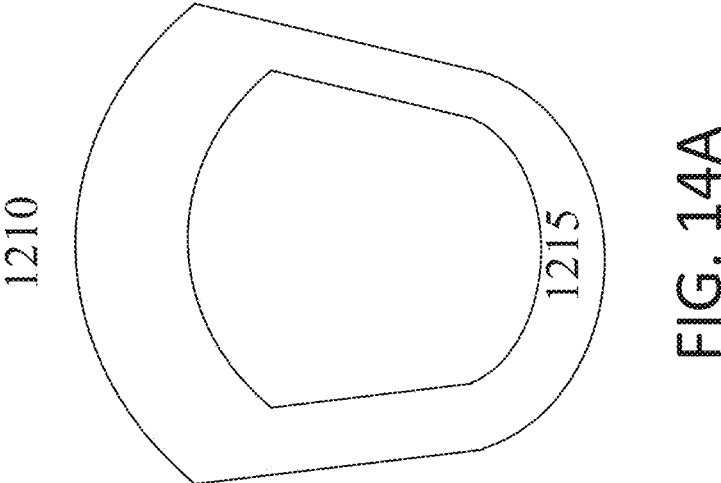

FIGS. 14A-14B show examples of a top view for heel inserts for use in some embodiments of the HFMS. FIG. 14A shows the heel insert 1210 with instep strap 1215. FIG. 14B shows another implementation of the heel insert 1220 with an instep clip 1225, to securely grasp an instep of the core, last, and/or the like of the HFMS mold.

Figure 15:
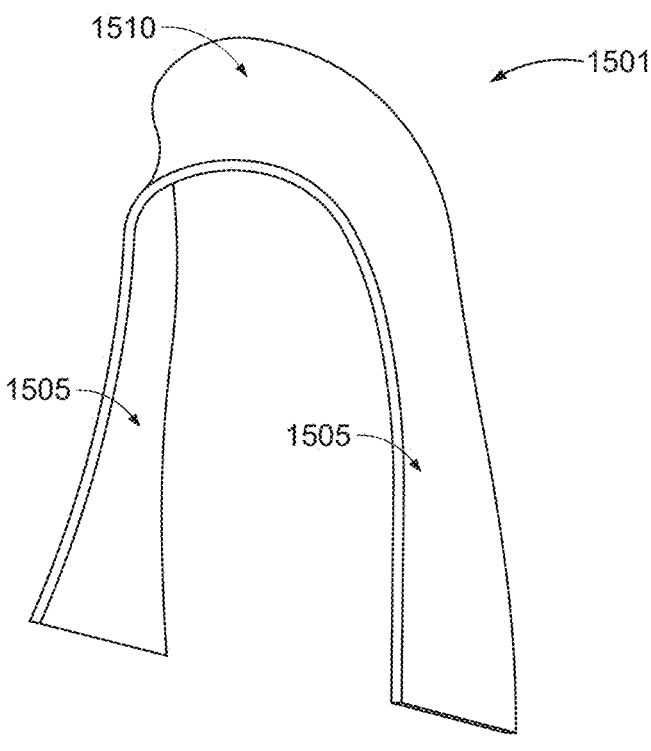
FIG. 15 shows an implementation of a heel brace baby mold 1501 in some embodiments of the HFMS.
Figure 16:
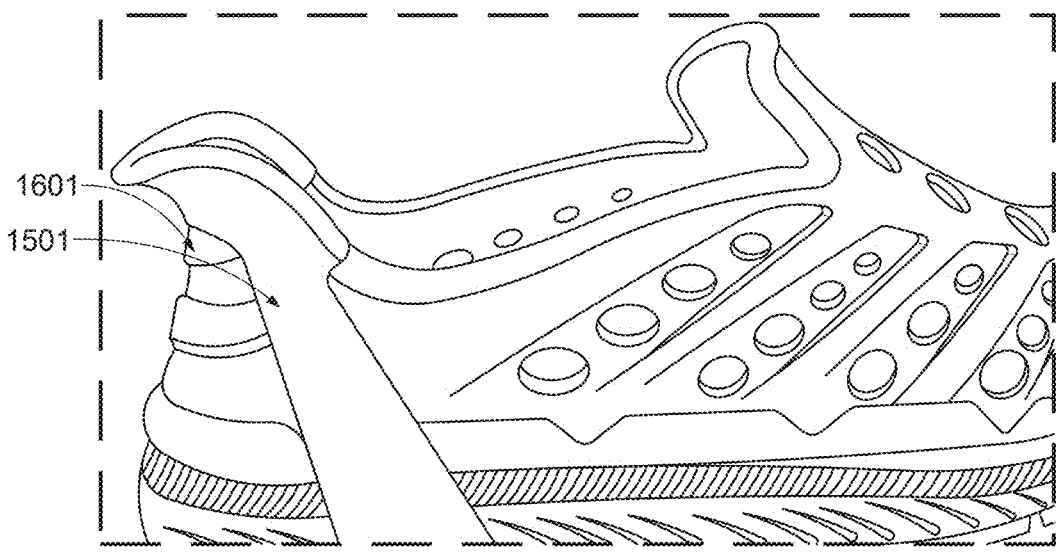
FIG. 16 shows an implementation of a heel brace baby mold positioned above a heel collar region in some embodiments of an HFMS.
Figure 17A:
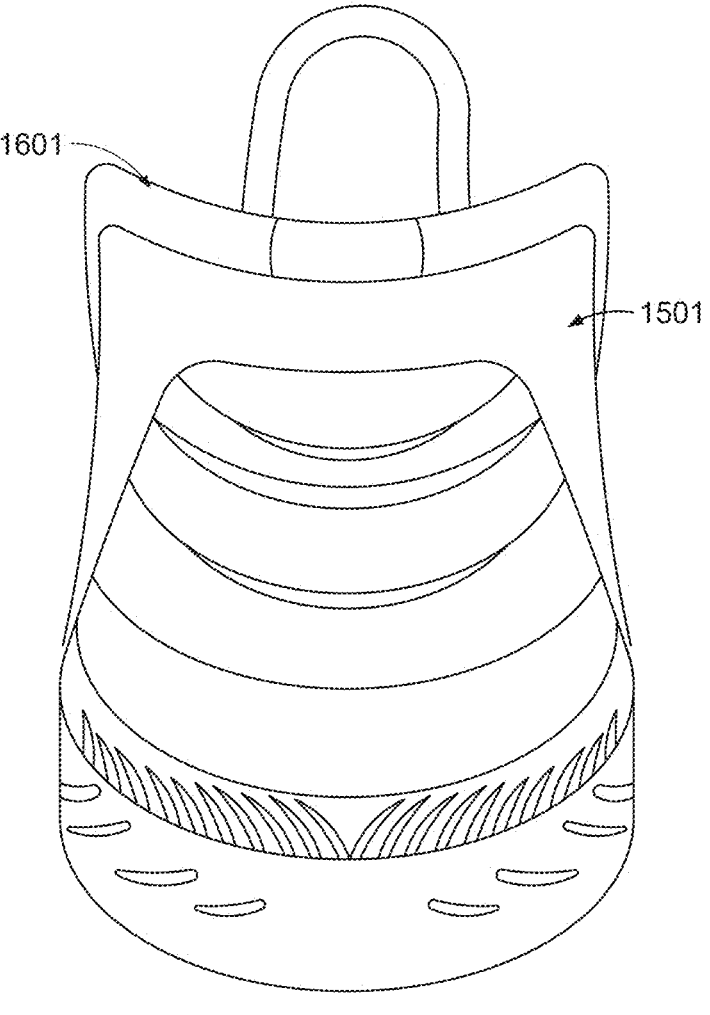
FIGS. 17A-17B show an alternative implementation of a heel brace baby mold positioned below a heel collar region in some embodiments of an HFMS.
Figure 17B:
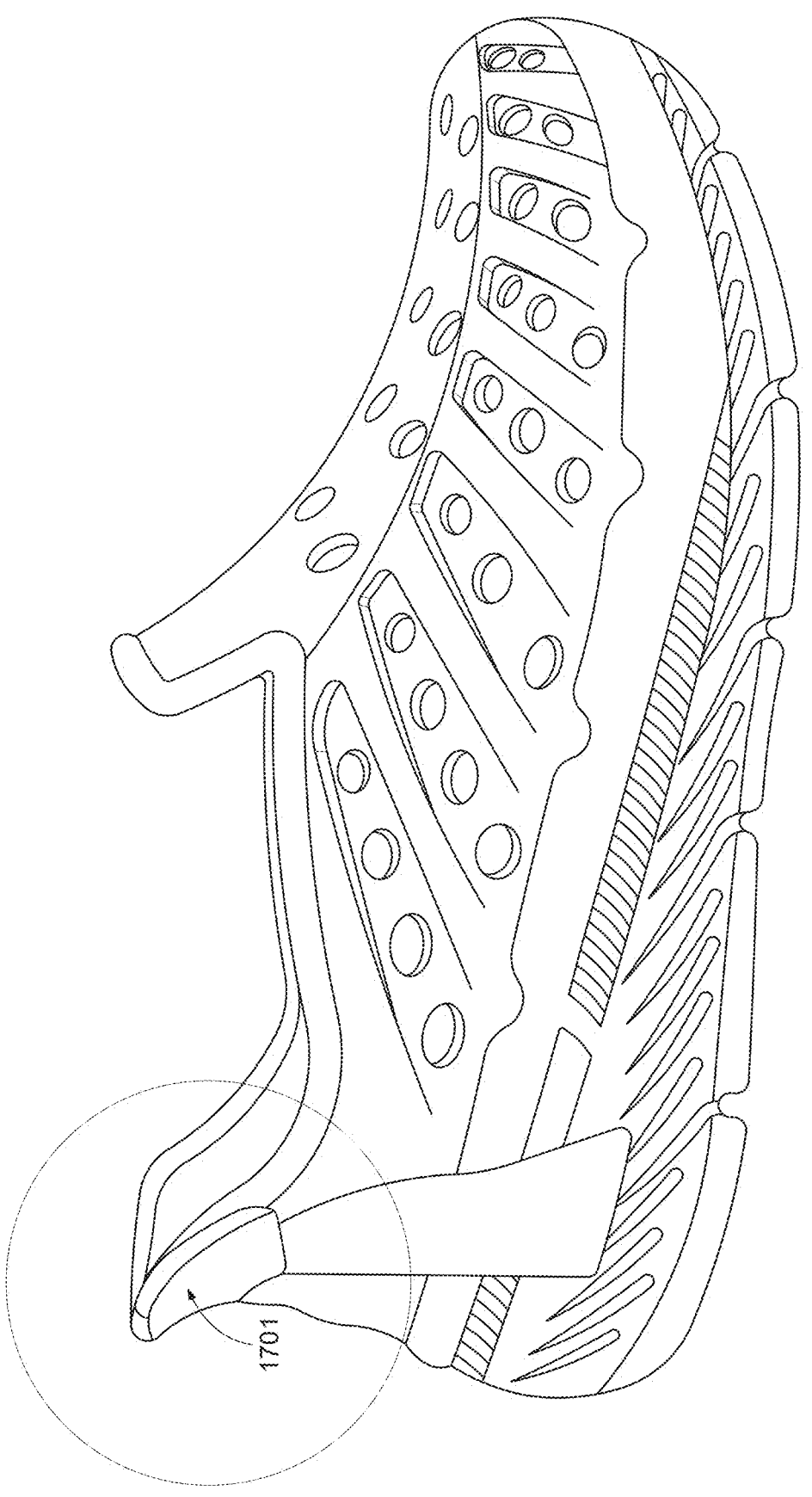

Additional and/or alternative baby molds and/or differently configured baby molds may be employed in connection with methods of manufacturing a HFMS in various implementations. For example, FIG. 15 shows an implementation of a heel brace baby mold 1501 in some embodiments of the HFMS. The heel brace baby mold 1501 may include side portions 1505, configured to be positioned at either side of a heel cup and/or between a heel cup and an upper of an HFMS, and a top portion 1510, configured to form a top, rearmost portion of an HFMS. In some implementations, the heel brace baby mold may be comprised of TPEE. FIG. 16 shows an implementation of a heel brace baby mold 1501 positioned above a heel collar region 1601 of an HFMS. FIGS. 17A-17B show an alternative implementation of a heel brace baby mold 1501 positioned below a heel collar region 1601. In FIG. 17B, a top beam of the heel brace baby mold is positioned in a pocket 1701 formed by a portion of plastic (e.g., EVA) of the heel collar.

Figure 18A:
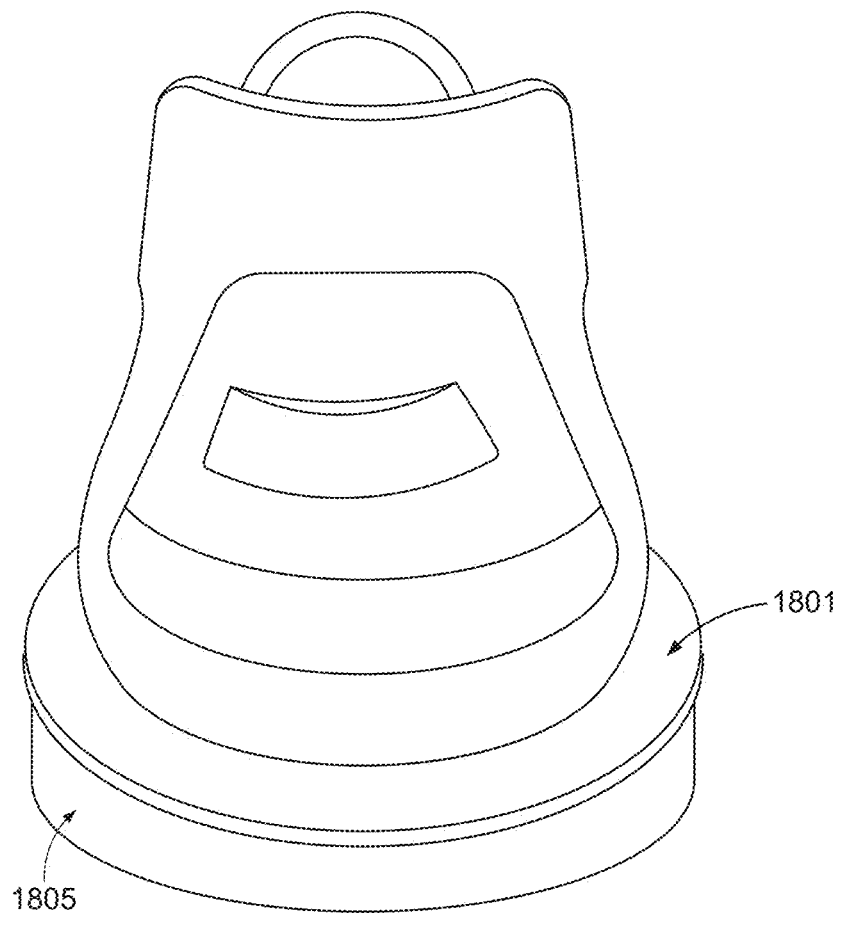
FIGS. 18A-18B show implementations of an open-back heel brace baby mold fitting onto a midsole platform in some embodiments of an HFMS.
Figure 18B:
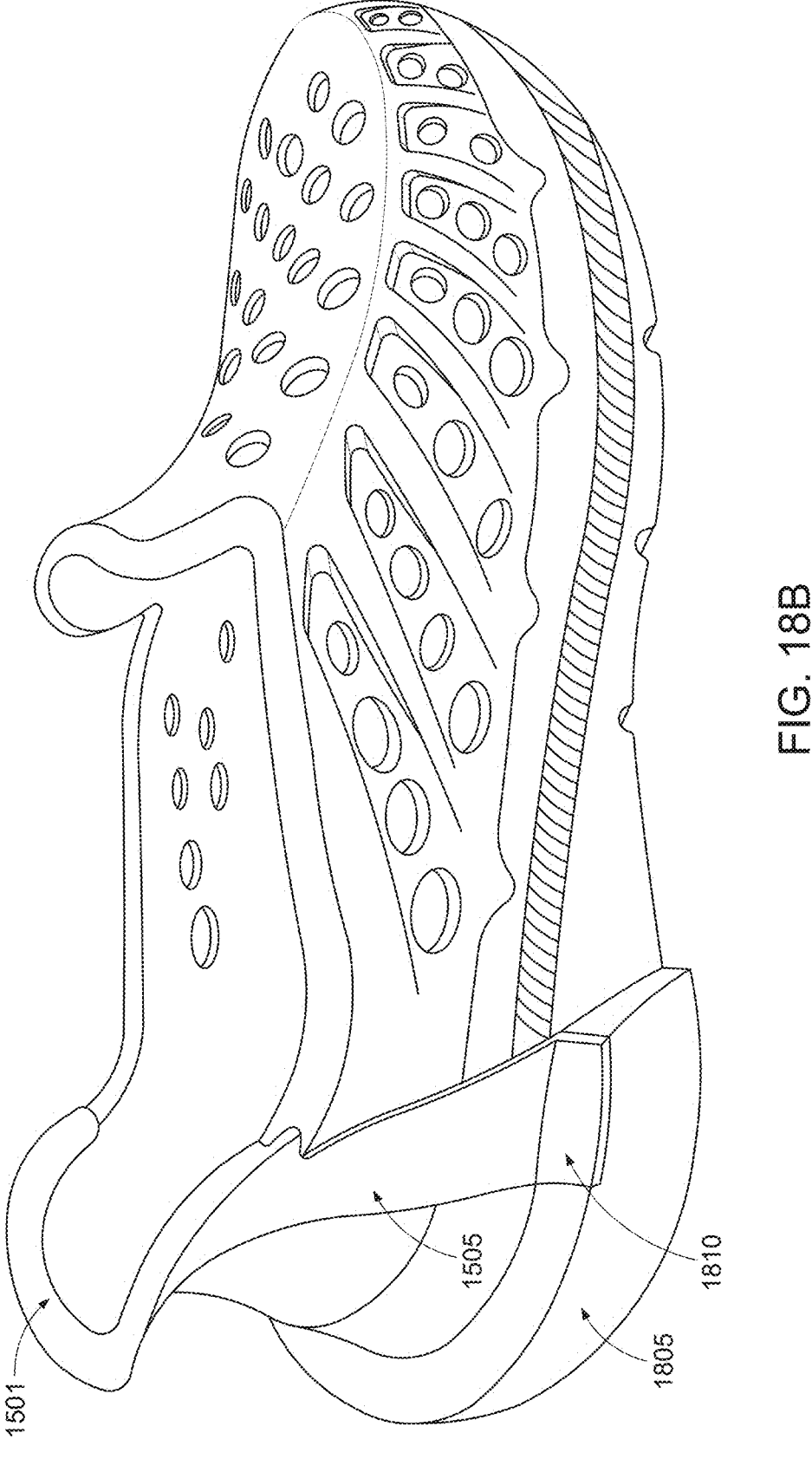
Figure 19A:
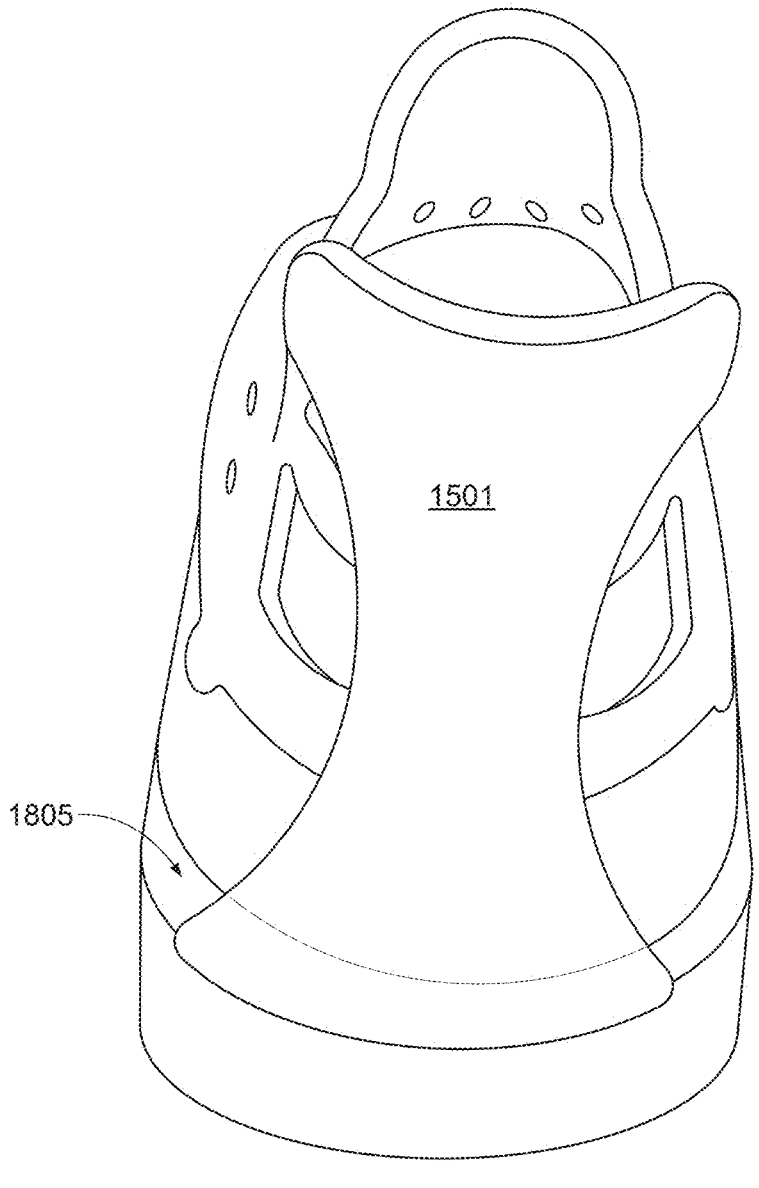
FIGS. 19A-19B show an implementation of a closed-back heel brace baby mold fitting onto a midsole platform in some embodiments of an HFMS.
Figure 19B:
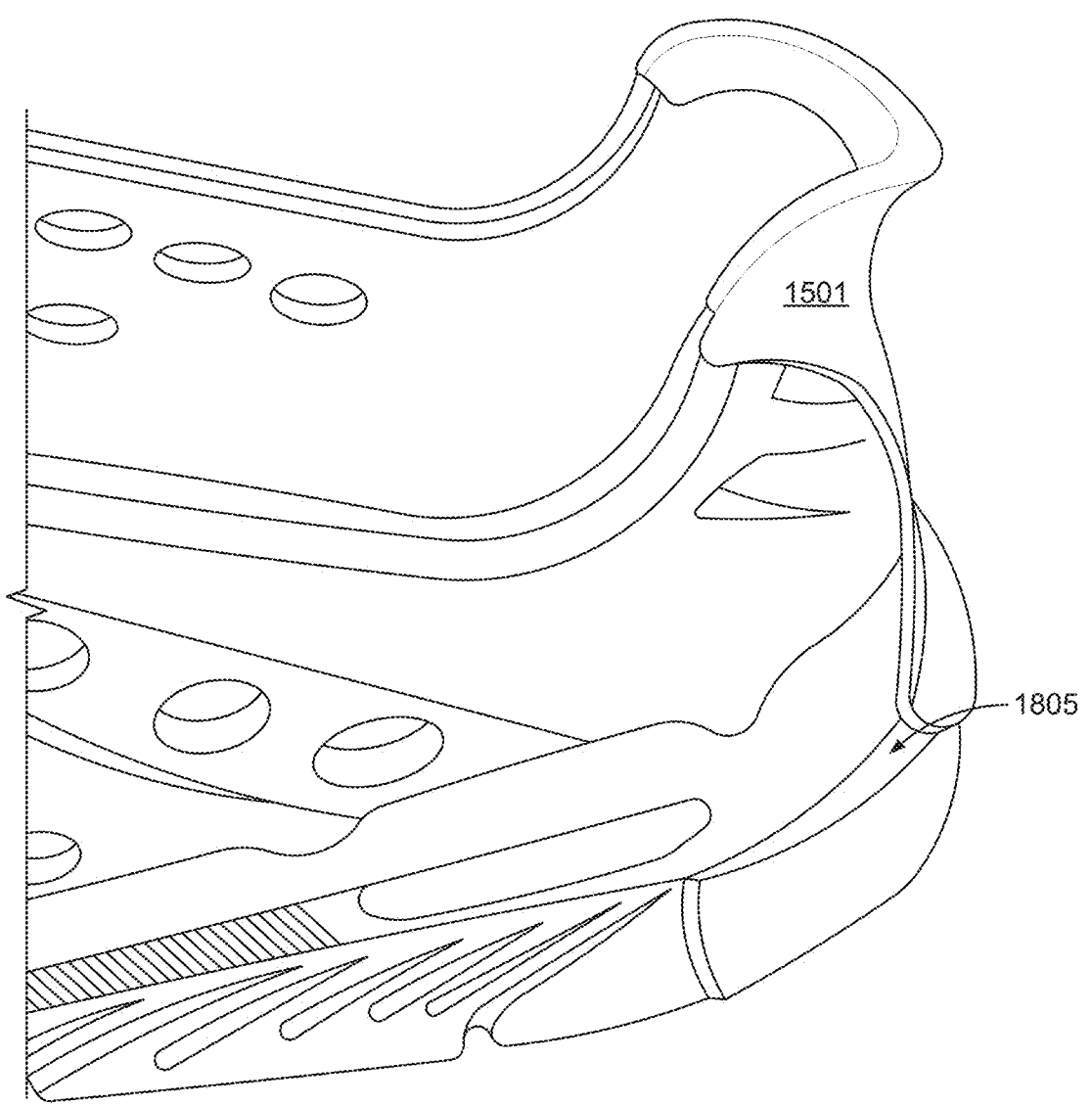

In some implementations, a heel brace baby mold may be secured by fitting onto a midsole platform for supporting the heel and facilitating release. For example, FIGS. 18A-18B show implementations of an open-back heel brace baby mold fitting onto a midsole platform. In FIG. 18A, a lower beam 1801 of the heel brace baby mold 1501 is positioned on the midsole platform 1805. In FIG. 18B, side portions 1505 of the heel brace baby mold 1501 include an extension 1810 configured to rest on the midsole platform 1805. FIGS. 19A-19B show an implementation of a closed-back heel brace baby mold 1501 fitting onto a midsole platform 1805. FIG. 19A shows a back view and FIG. 19B shows a left side view.

Figure 20A:
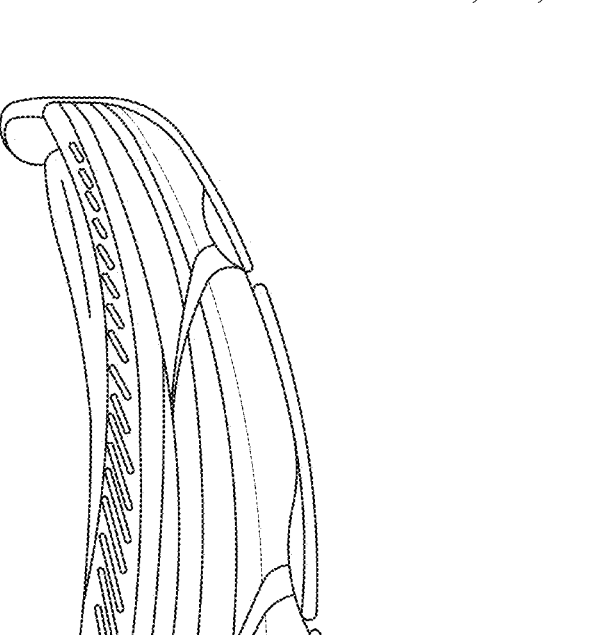
FIGS. 20A-20F show an example of a uniformly molded sole and heel cup configured to accommodate an upper comprised of one or more different materials in some embodiments of an HFMS.
Figure 20B:
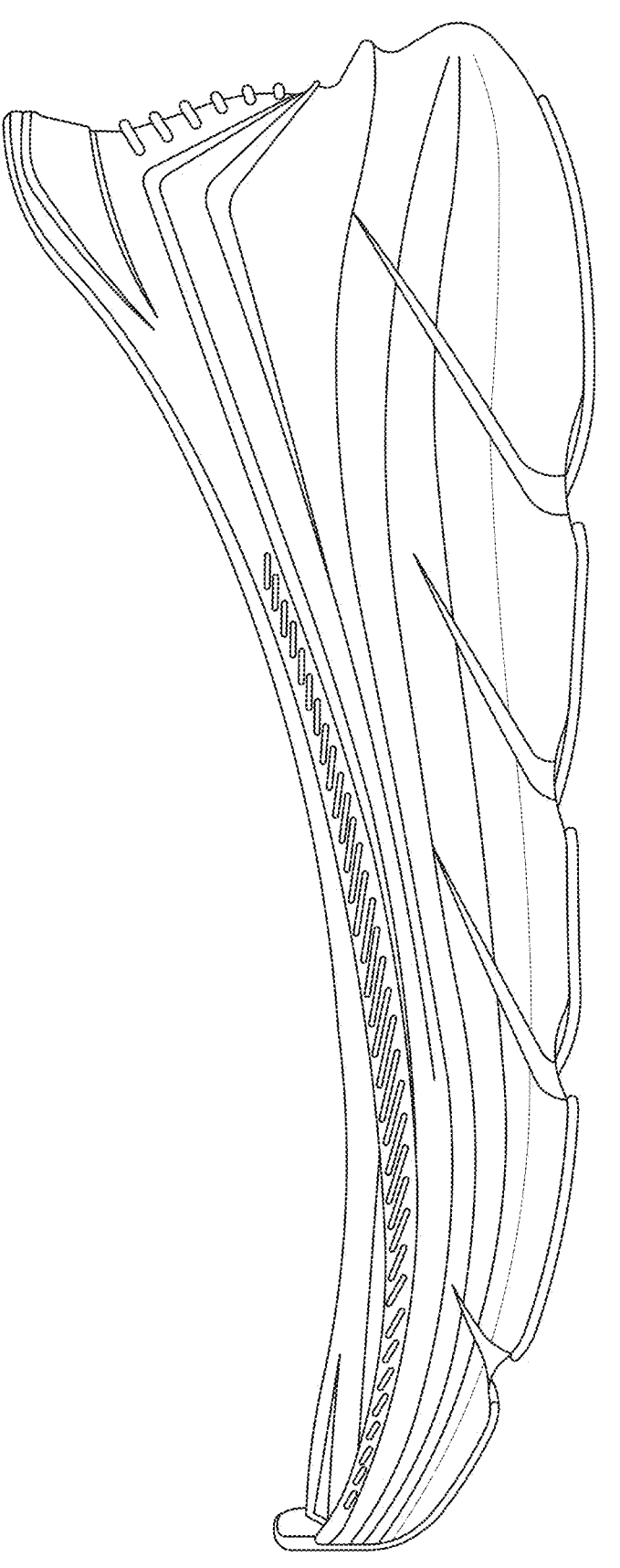
Figure 20C:
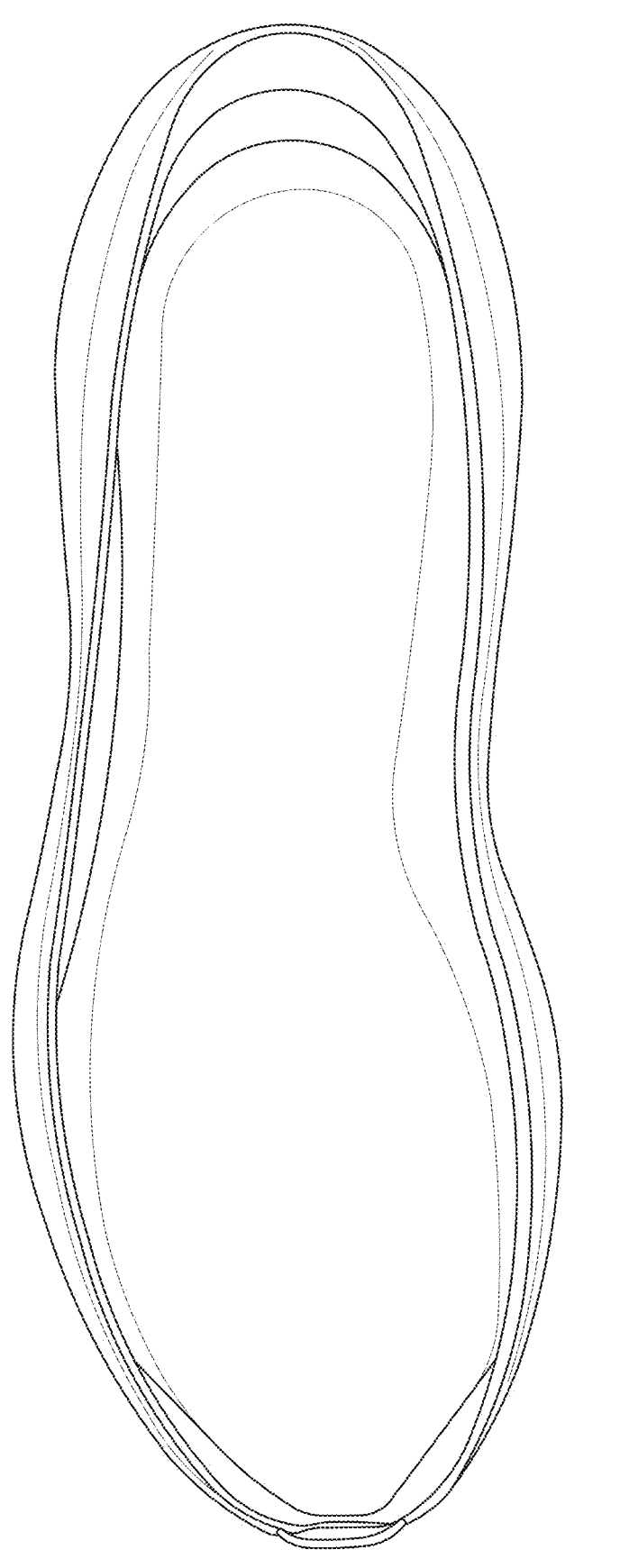
Figure 20D:
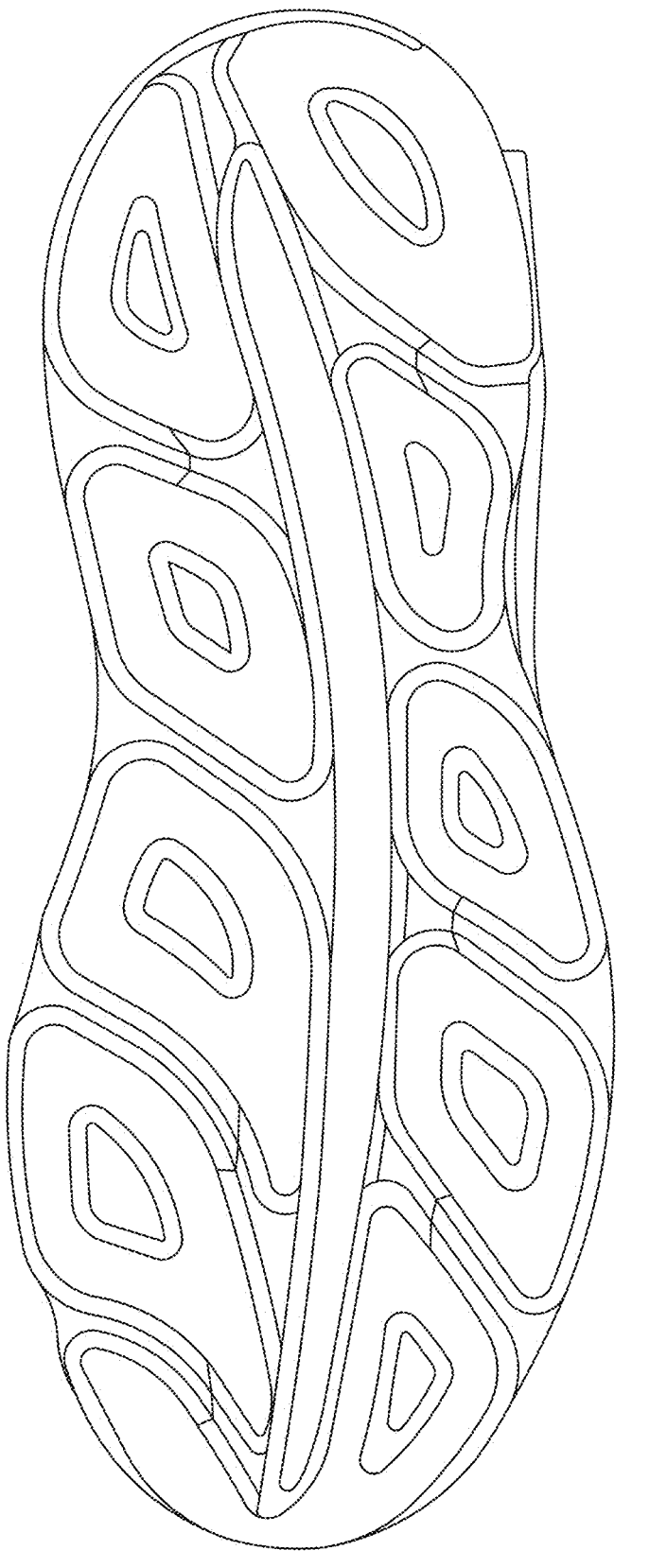
Figure 20E:
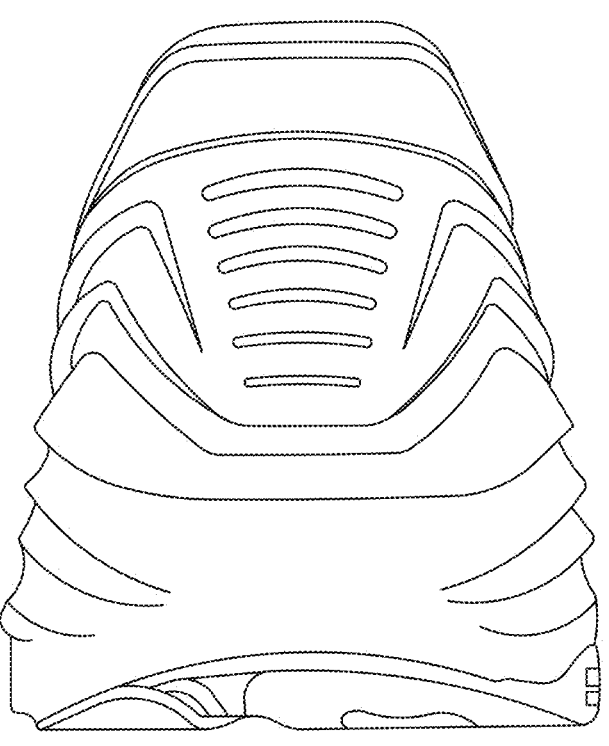
Figure 20F:
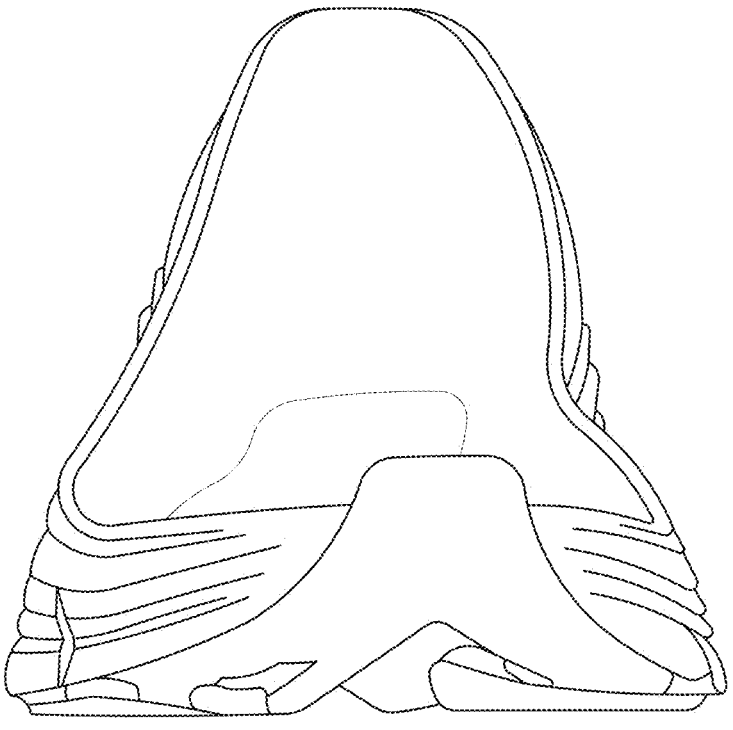
Figure 21A:
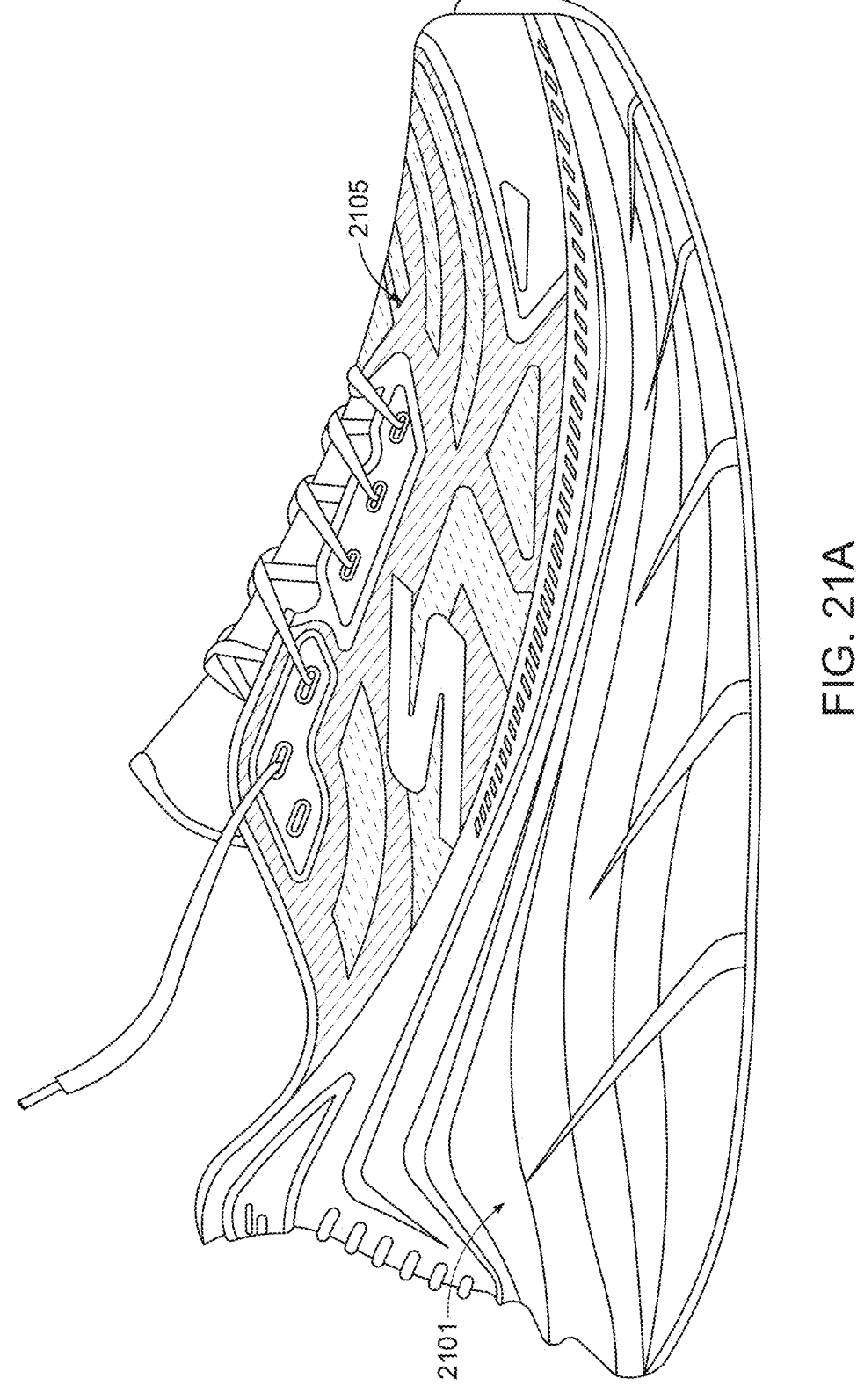
FIGS. 21A-21B show an example of a shoe including a uniformly molded sole and heel cup, and upper comprising mesh fabric, in some embodiments of an HFMS.
Figure 21B:
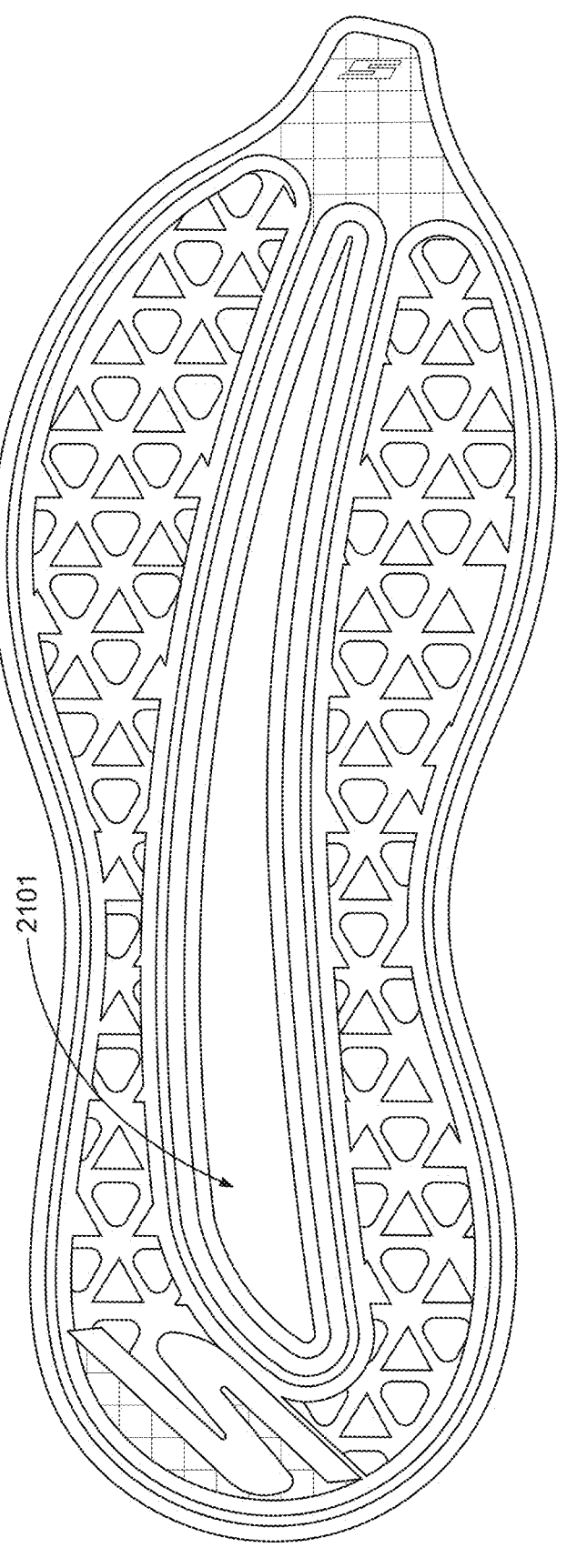

As noted above, in some implementations, a sole and heel cup may be uniformly molded plastic while the upper is comprised of mesh fabric, synthetic fabric, nylon, suede, and/or the like. FIGS. 20A-20F show an example of a uniformly molded sole and heel cup configured to accommodate an upper comprised of one or more different materials such as mesh fabric, synthetic fabric, nylon, suede, and/or the like, including right side view (FIG. 20A), left side view (FIG. 20B), top view (FIG. 20C), bottom view (FIG. 20D), back view (FIG. 20E), and front view (FIG. 20F). FIGS. 21A-21B show an example of a shoe, in side view (FIG. 21A) and top view (FIG. 21B), including a uniformly molded sole and heel cup 2101 and upper comprising mesh fabric 2105. In various implementations, the upper may comprise at least one later of elastic material positioned to stretch and create tension that enhances securement of a foot inserted into the shoe.

The following descriptions of various innovations within the scope of the HFMS illustrate further aspects of an HFMS and/or HFMS manufacturing process in various embodiments:

1. An article of footwear, comprising:
a sole structure;
a heel cup uniformly molded with the sole structure, and extending from the sole structure to at least a portion of the rear heel collar of an upper;
the heel cup uniformly molded with an upper portion, midportion, and lower portion wherein the upper portion has a smaller mediolateral length than the midportion, and the midportion and lower portion form a concave structure configured to receive the heel;
the upper portion having a first configuration; the upper portion capable of distorting into a second configuration under a load of a user's foot when the user is donning the footwear; and wherein in the second configuration at least part of the upper portion is lowered relative to the first configuration; the upper portion capable of returning to the first configuration after the load of user's foot is removed.

2. The article of footwear of innovation 1, further comprising:
an upper, wherein
the upper defines a foot receiving show opening; and
the heel cup and sole structure are uniformly molded with the upper.

3. The article of footwear of innovation 2, wherein the heel cup is comprised of a first plastic and the upper is comprised of a second plastic, the first plastic having a different hardness than the second plastic.

4. The article of footwear of innovation 2, wherein the heel cup and sole are comprised of a first plastic and the upper is comprised of mesh fabric.

5. The article of footwear of innovation 1, wherein the heel cup is comprised of a first plastic and the sole is comprised of a second plastic, the first plastic having a different hardness than the second plastic.

6. The article of footwear of innovation 1, wherein the midportion defines a peripheral portion and a central portion; the peripheral portion having a first thickness; and
the central portion having a second thickness; the second thickness being less than the first thickness.

7. The article of footwear of innovation 1, further comprising:
an interior foam layer integrally molded at a back inner wall of the heel cup.

8. The article of footwear of innovation 1, wherein in a vertical cross-section, the heel cup has an S wave shape.

9. The article of footwear of innovation 8, wherein in the vertical cross-section, the upper portion has a first thickness in a first location;
wherein in the vertical cross-section, the midportion has a second thickness in a second location;
wherein in the vertical cross-section, the lower portion has a third thickness in a third location;
wherein the second thickness is smaller than at least one of the first thickness and the second thickness.

10. An article of footwear, comprising:
a uniformly-molded upper, sole, and heel cup;
wherein the heel cup is comprised of a first plastic and the upper is comprised of a second plastic, the first plastic having a different hardness than the second plastic.

11. The article of footwear of innovation 10, wherein the first plastic has a greater hardness than the second plastic.

12. The article of footwear of innovation 11, wherein the heel cup is uniformly molded with an upper portion, midportion, and lower portion, wherein the upper portion has a smaller mediolateral length than the midportion, and the midportion and lower portion form a concave structure configured to receive the heel;
wherein the upper portion has a first configuration and is configured to distort into a second configuration under a load of a user's foot when the user is donning the footwear.

13. The article of footwear of innovation 12, wherein in a vertical cross-section, the heel cup has an S wave shape.

14. The article of footwear of innovation 13, wherein in the vertical cross-section, the upper portion has a first thickness in a first location;
wherein in the vertical cross-section, the midportion has a second thickness in a second location;

wherein in the vertical cross-section, the lower portion has a third thickness in a third location;

wherein the second thickness is smaller than at least one of the first thickness and the second thickness 15. An article of footwear, comprising:

a uniformly-molded sole, and heel cup;

wherein the heel cup is comprised of a first plastic and the sole is comprised of a second plastic, the first plastic having a different hardness than the second plastic.

16. The article of footwear of innovation 15, wherein the first plastic has a greater hardness than the second plastic.

17. The article of footwear of innovation 16, further comprising:

an upper uniformly molded with the sole and heel cup.

18. A method for manufacturing an article of footwear, comprising:

placing a substrate insert into a first shoe mold, wherein the substrate insert comprises a heel insert;

providing a first plastic to yield a substrate;

placing the substrate and an overmold insert into a second shoe mold; and providing a second plastic to yield a shoe, wherein the first plastic has a greater hardness than the second plastic.

19. The method of innovation 18, wherein providing a first plastic and providing a second plastic is performed by injection molding.

20. The method of innovation 18, wherein providing a first plastic and providing a second plastic is performed by pouring plastic pellets.

21. The method of innovation 18, wherein the heel insert includes an instep strap.

22. The method of innovation 18, wherein the overmold insert further comprises a sole insert.

23. The method of innovation 18, wherein the substrate insert comprises a sole insert.

24. The method of innovation 18, wherein the first shoe mold and the second shoe mold are the same.

25. An apparatus for manufacturing an article of footwear, comprising:

a shoe mold;

an upper insert;

a sole insert; and a heel insert comprising a securing mechanism for affixing the heel insert to a core of the shoe mold.

26. The apparatus of innovation 25, wherein the securing mechanism comprises an instep strap.

27. The apparatus of innovation 25, wherein the securing mechanism comprises an instep clip.

28. The apparatus of innovation 25, wherein in a vertical cross-section, a rear portion of the heel insert has an S wave shape.

In order to address various issues and advance the art, the entirety of this application for HANDS-FREE MOLDED SHOE (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any process steps and/or feature sets as described in the figures and/or throughout are not limited to a fixed operating order and/or arrangement, but rather, any disclosed order is exemplary and all equivalents, regardless of order, are contemplated by the disclosure. Similarly, some features are applicable to one aspect of the innovations, and inapplicable to others. In addition, the disclosure includes multiple innovations including some that may not be presently claimed, and the Applicant reserves all rights in those presently unclaimed innovations including the right to claim such innovations, file additional applications, continuations, continuations in part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A method for manufacturing an article of footwear, comprising:

providing a first plastic to a first shoe mold to yield a heel insert substrate;

placing the heel insert substrate into a second shoe mold;

providing a second plastic to the second shoe mold to overmold the heel insert substrate and yield a shoe;

wherein the first plastic has a greater hardness than the second plastic; and wherein a portion of at least one of the first plastic and second plastic extends from a sole structure to at least a portion of a rear heel collar of the shoe.

2. The method of claim 1, wherein providing the first plastic and providing the second plastic is performed by injection molding.

3. The method of claim 1, wherein providing a first plastic and providing a second plastic is performed by pouring plastic pellets.

4. The method of claim 1, wherein the heel insert includes an instep strap.

5. The method of claim 1, wherein the first shoe mold and the second shoe mold are the same.

6. A method of manufacturing an article of footwear, comprising:

injecting a first plastic material having a first hardness into a first mold to form a heel insert;

injecting a second plastic material having a second hardness into a second mold to form an upper heel substrate;

injecting a third plastic material having a third hardness into a third mold to form a sole substrate; and positioning and uniformly molding the heel insert, the upper heel substrate, and the sole substrate into a fourth mold.

7. The method of claim 6, wherein the first plastic material has a greater hardness than the second plastic material.

8. The method of claim 6, wherein the hardness of the first plastic material and the second plastic material are the same.

9. The method of claim 6, wherein the method further comprises coupling a compressible heel cup to at least one of the first plastic material or the second plastic material.

10. The method of claim 6, wherein the first plastic material is selected from the group consisting of ethylene-vinyl acetate (EVA), compression-molded EVA (CMEVA), Thermoplastic Polyester Elastomer (TPEE), and Thermoplastic Polyurethane (TPU).

11. The method of claim 6, wherein the second plastic material comprises Thermoplastic Polyester Elastomer (TPEE).

12. The method of claim 6, further comprising removing the substrate from the first mold prior to placing it into the second mold.

13. The method of claim 6, wherein injecting the first plastic material and the second plastic material comprises injection molding.

14. The method of claim 6, injecting the first plastic material and the second plastic material comprises pellet pouring.

15. The method of claim 6, wherein the heel insert comprises a securing feature configured to hold the heel insert in place within the second mold.

16. The method of claim 6 wherein a portion of at least one of the first plastic material and second plastic material extends from the sole substrate to at least a portion of a rear heel collar of the article of footwear.

17. A method of manufacturing an article of footwear, comprising:

placing a heel cup having a first hardness into a mold;

positioning a heel cup overmold in the mold adjacent to the heel cup;

the heel cup overmold having a second hardness;

injecting a plastic material having a different hardness than the heel cup into the mold;

molding the plastic onto the heel cup and heel cup overmold to form a shoe structure; and wherein a portion of at least one of the heel cup and heel cup overmold extends from a sole structure to at least a portion of a rear heel collar of the shoe structure.

18. The method of claim 17, wherein the heel cup forms at least part of a heel collar region of the footwear.

19. The method of claim 17, wherein the heel cup overmold forms at least part of a heel collar region of the footwear.

20. The method of claim 17, wherein the heel cup has a greater hardness than the plastic material.

21. The method of claim 17, wherein the heel cup has an S-wave shape cross-sectional profile having an upper arc and a lower arc.

22. The method of claim 17, wherein the heel cup and heel cup overmold are formed by injection co-molding.

* * * * *